(12) United States Patent
de Beaudrap et al.

(10) Patent No.: US 11,146,339 B1
(45) Date of Patent: Oct. 12, 2021

(54) METHOD OF OPERATING A QUANTUM INFORMATION PROCESSING SYSTEM

(71) Applicant: Oxford University Innovation Limited, Oxford (GB)

(72) Inventors: Jonathan Robert Niel de Beaudrap, Oxford (GB); Steven Herbert, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 17/064,980

(22) Filed: Oct. 7, 2020

(51) Int. Cl.
  *H04B 10/00* (2013.01)
  *H04B 10/70* (2013.01)
  *H04B 10/29* (2013.01)
  *G06N 10/00* (2019.01)

(52) U.S. Cl.
  CPC ............. *H04B 10/70* (2013.01); *G06N 10/00* (2019.01); *H04B 10/29* (2013.01)

(58) Field of Classification Search
  CPC .... H04B 10/70; H04B 10/29; H04B 10/0795; H04L 9/0852; H04L 9/0858; H04L 9/0855; G06N 10/00; G06N 99/002; B82Y 10/00
  USPC ......... 398/140, 141, 25, 33, 40, 58, 79, 135, 398/136, 158, 159, 173, 175; 380/255, 380/256, 278, 283, 264
  See application file for complete search history.

(56) References Cited

U.S. PATENT DOCUMENTS

| | | | |
|---|---|---|---|
| 9,663,358 B1 * | 5/2017 | Cory | G06F 7/38 |
| 2014/0079387 A1 * | 3/2014 | Martin | H04B 10/0795 398/25 |
| 2020/0311594 A1 * | 10/2020 | Gidney | G06F 7/5057 |

* cited by examiner

*Primary Examiner* — Hanh Phan
(74) *Attorney, Agent, or Firm* — Thomas|Horstemeyer, LLP

(57) ABSTRACT

A method of operating a quantum information processing system. The quantum information processing system includes an array of connected qubits. The method of operating the quantum information processing system uses a linear network coding solution to performing an operation between the quantum states of two or more qubits of the array.

19 Claims, 11 Drawing Sheets

METHOD OF OPERATING A QUANTUM INFORMATION PROCESSING SYSTEM

BACKGROUND

The present invention relates to a method of operating a quantum information processing system, in particular to a method of distributing entanglement between remote qubits in a quantum architecture network.

Quantum information processing systems exploit quantum mechanical phenomena such as superposition and entanglement to perform data processing calculations. In order to provide a large scale system, capable of performing useful calculations, a network of multiple qubits needs to be provided. If not all the qubits are connected directly to each other, a means of performing calculations between qubits in the network that are remote from each other (i.e. are not directly connected) needs to be provided.

One way to perform such calculations is to distribute the entanglement of qubits across the quantum network. One way of doing this is the technique of "entanglement swapping", but this may require entangled states to be distributed sequentially owing to bottlenecks in the network. Classical network coding solutions may be used as an alternative approach to distribute multiple entangled states concurrently, but standard techniques for doing so generally require an amount of time which scales with the size of the quantum network. This increases the time for the entanglement distribution to be performed, resulting in a greater likelihood of quantum decoherence and a loss of the entanglement between the qubits. Because of this, current operations performed on quantum information processing systems tend to rely on the "routing" of qubits, in which data is transmitted through the network. This results in the data being subject to additional noise before a computationally significant operation is performed on it.

The present invention aims to provide improved methods of operating quantum information processing systems.

When viewed from a first aspect the invention provides a method of operating a quantum information processing system, wherein the quantum information processing system comprises an array of a plurality of qubits and a plurality of connections between the plurality of qubits in the array, wherein the plurality of qubits in the array and the plurality of connections between the plurality of qubits are arranged such that at least two of the qubits in the array do not have a direct connection therebetween;
  wherein the method of operating the quantum information processing system comprises:
    for a linear network coding solution for performing an operation or operations between the quantum states of two or more qubits of the plurality of qubits;
      wherein the linear network coding solution is based on a network of a plurality of nodes corresponding to the plurality of qubits and a plurality of edges between the nodes corresponding to the plurality of connections between the qubits; and
      wherein each of the plurality of edges comprises a direction from one of the plurality of nodes to another of the plurality of nodes, such that the plurality of nodes comprise:
        one or more transmitter nodes that are connected to only one or more outgoing edges of the plurality of edges, each of the one or more outgoing edges having a direction towards another node;
        one or more receiver nodes that are connected to only one or more incoming edges of the plurality of edges, each of the one or more incoming edges having a direction from another node; and
        one or more relay nodes that are each connected to at least an outgoing edge having a direction towards another node and to at least an incoming edge having a direction from another node:
    determining a time ordering of the plurality of nodes of the network for operating on the plurality of qubits, the time ordering of the plurality of nodes comprising a group of a plurality of initial nodes that are first in the time ordering of the plurality of nodes, one or more groups each of a plurality of intermediate nodes that are intermediate in the time ordering of the plurality of nodes, and a group of a plurality of final nodes that are last in the time ordering of the plurality of nodes;
    determining a time ordering of the plurality of edges of the network for operating between the plurality of qubits, wherein the time ordering is determined for the plurality of outgoing edges for the nodes in each of the groups of nodes in the time ordering of the plurality of nodes;
    initialising the state of each of the plurality of qubits;
    for the transmitter and relay nodes of the group of the plurality of initial nodes:
      for each of the outgoing edges from these transmitter and relay nodes in order of the time ordering of the plurality of edges:
        performing an operation between the quantum states of the pair of qubits that are connected by the connection corresponding to the outgoing edge;
    for the transmitter and relay nodes of each of the groups of the plurality of intermediate nodes, processed in the time ordering of the intermediate groups:
      for each of the outgoing edges from these transmitter and relay nodes in order of the time ordering of the plurality of edges:
        performing an operation between the quantum states of the pair of qubits that are connected by the connection corresponding to the outgoing edge;
        for the relay nodes of the group of the plurality of intermediate nodes that have an incoming edge from a node of a group of nodes having an earlier time ordering, realising a measurement of the quantum states of the qubits corresponding to those relay nodes of the group of the plurality of intermediate nodes; and
        for the relay nodes of the group of the plurality of intermediate nodes that have an incoming edge from a node of a group of nodes having a later time ordering, for each of the outgoing edges from these relay nodes in order of the time ordering of the plurality of edges, performing an operation between the quantum states of the pair of qubits that are connected by the connection corresponding to the outgoing edge;
    for the transmitter and relay nodes of the group of the plurality of final nodes:
      for each of the outgoing edges from these transmitter and relay nodes in order of the time ordering of the plurality of edges:
        performing an operation between the quantum states of the pair of qubits that are connected by the connection corresponding to the outgoing edge;

for all of the relay nodes of the plurality of nodes, realising a measurement of the quantum states of the qubits corresponding to the relay nodes; and for all of the receiver nodes of the plurality of nodes, performing an operation on the quantum states of the qubits corresponding to the receiver nodes.

When viewed from a second aspect the invention provides a quantum information processing system for performing an operation or operations between the quantum states of two or more qubits of a plurality of qubits of the quantum information processing system, wherein the quantum information processing system comprises:

an array of a plurality of qubits and a plurality of connections between the plurality of qubits in the array, wherein the plurality of qubits in the array and the plurality of connections between the plurality of qubits are arranged such that at least two of the qubits in the array do not have a direct connection therebetween;

wherein the quantum information processing system is configured to:

for a linear network coding solution for performing an operation or operations between the quantum states of two or more qubits of the plurality of qubits;

wherein the linear network coding solution is based on a network of a plurality of nodes corresponding to the plurality of qubits and a plurality of edges between the nodes corresponding to the plurality of connections between the qubits; and wherein each of the plurality of edges comprises a direction from one of the plurality of nodes to another of the plurality of nodes, such that the plurality of nodes comprise:

one or more transmitter nodes that are connected to only one or more outgoing edges of the plurality of edges, each of the one or more outgoing edges having a direction towards another node;

one or more receiver nodes that are connected to only one or more incoming edges of the plurality of edges, each of the one or more incoming edges having a direction from another node; and one or more relay nodes that are each connected to at least an outgoing edge having a direction towards another node and to at least an incoming edge having a direction from another node:

determine a time ordering of the plurality of nodes of the network for operating on the plurality of qubits, the time ordering of the plurality of nodes comprising a group of a plurality of initial nodes that are first in the time ordering of the plurality of nodes, one or more groups each of a plurality of intermediate nodes that are intermediate in the time ordering of the plurality of nodes, and a group of a plurality of final nodes that are last in the time ordering of the plurality of nodes;

determine a time ordering of the plurality of edges of the network for operating between the plurality of qubits, wherein the time ordering is determined for the plurality of outgoing edges for the nodes in each of the groups of nodes in the time ordering of the plurality of nodes;

initialise the state of each of the plurality of qubits;

for the transmitter and relay nodes of the group of the plurality of initial nodes:

for each of the outgoing edges from these transmitter and relay nodes in order of the time ordering of the plurality of edges:

perform an operation between the quantum states of the pair of qubits that are connected by the connection corresponding to the outgoing edge;

for the transmitter and relay nodes of each of the groups of the plurality of intermediate nodes, processed in the time ordering of the intermediate groups:

for each of the outgoing edges from these transmitter and relay nodes in order of the time ordering of the plurality of edges:

perform an operation between the quantum states of the pair of qubits that are connected by the connection corresponding to the outgoing edge;

for the relay nodes of the group of the plurality of intermediate nodes that have an incoming edge from a node of a group of nodes having an earlier time ordering, realise or simulate a measurement of the quantum states of the qubits corresponding to those relay nodes of the group of the plurality of intermediate nodes; and for the relay nodes of the group of the plurality of intermediate nodes that have an incoming edge from a node of a group of nodes having a later time ordering, for each of the outgoing edges from these relay nodes in order of the time ordering of the plurality of edges, perform an operation between the quantum states of the pair of qubits that are connected by the connection corresponding to the outgoing edge;

for the transmitter and relay nodes of the group of the plurality of final nodes:

for each of the outgoing edges from these transmitter and relay nodes in order of the time ordering of the plurality of edges:

perform an operation between the quantum states of the pair of qubits that are connected by the connection corresponding to the outgoing edge;

for all of the relay nodes of the plurality of nodes, realise or simulate a measurement of the quantum states of the qubits corresponding to the relay nodes; and for all of the receiver nodes of the plurality of nodes, perform an operation on the quantum states of the qubits corresponding to the receiver nodes.

When viewed from a third aspect the invention provides a non-transitory computer readable storage medium storing computer software code which when executing on a quantum information processing system performs a method as outlined in the first aspect of the invention.

The present invention provides a method of operating a quantum information processing system to (and an a quantum information processing system for) operate on the quantum states of qubits that are remote from each other in an array of multiple qubits (e.g. to share a Bell pair between these remote qubits, which may be used to realise "gate teleportations" simultaneously between multiple such pairs of remote qubits). The method and system of the present invention does this by taking a linear network coding solution for operating on these remote qubits (corresponding to nodes of the network to which the linear network coding solution has been determined), and determining a schedule (time ordering) for the nodes and for the connections therebetween.

The method (and the system is configured to) translates the protocol of the linear network coding solution onto the array of qubits, such that pairs of (e.g. adjacent) qubits are entangled, in order to distribute multiple entangled states across the array, to perform the desired quantum operation on the multiple pairs of remote qubits. This allows, through the classical operations of the linear network coding solution the quantum array of the qubits to be exploited. Thus, multiple two-qubit operations may be performed concurrently, between pairs of qubits that are each remote from each other in the array, e.g. through gate teleportation (transferring quantum states across the array through use of quantum operations such as logic gates).

In this way, the entanglement between two qubits close together (which is more straightforward to control) can be exploited to extend entanglement interactions across the array to mediate an interaction between multiple pairs of remote qubits in the array. In turn, for the array of multiple qubits, this helps to allow information to be distributed over the array while maintaining quantum coherence.

It will be appreciated that, owing to the quantum nature of the states and the qubits (i.e. the quantum operations performed and the entanglement that is created between the qubits), correlations between the quantum states of the qubits are being forwarded as a result of the operations dictated by the linear network coding solution, as opposed to data that would be transmitted over a classical network. This means that the method and system of the present invention do not have to operate sequentially (as would be the case in a classical network) to implement the linear network coding solution, thus allowing entanglement to be distributed in parallel.

The method and system of the present invention are therefore able to operate more efficiently and quickly, owing to the fewer time-steps in the sequence that results from not having the problem of sequentiality. It thus reduces the depth of the network (i.e. the depth of the entanglement distribution circuit corresponding to the network code), in a way that independent of the size of the network or the distance over which entanglement is to be distributed. This helps both to reduce the susceptibility of the quantum information processing system to loss of coherence between the qubits and noise in the system, which allows a practical realisation of operations on quantum architectures, and to reduce the time taken to perform the necessary operations.

The array of a plurality of qubits and the associated network of a plurality of nodes, such that each node in the network corresponds to a qubit in the array, and the (directed) edges between the nodes in the network correspond to the connections between the qubits in the array, may be provided in any suitable and desired way. Preferably the array of qubits corresponds directly to the network of nodes, i.e. there is a one-to-one correspondence between the qubits and nodes, and a one-to-one correspondence between the connections and the edges.

Thus, preferably the number of qubits is equal to the number of nodes, the number of connections is equal to the number of edges and the arrangement of the connections (i.e. the qubits they connect) is the same as the arrangement of the edges (i.e. the nodes they connect). Preferably the array of qubits and the network of nodes are arranged such that the pairs of qubits of the array that can interact (i.e. qubits connected by connections) are restricted to the corresponding pairs of the network that are connected by edges of the network. Thus preferably operations between qubits are performed only on adjacent (i.e. connected) pairs of qubits (corresponding to nodes connected by edges), such that only adjacent (i.e. connected) pairs of qubits are allowed to interact.

Preferably only pairs of qubits for which a CNOT operation is able to be realised on the pair of qubits are connected (and thus preferably the network only comprises corresponding edges between the corresponding pairs of nodes). Preferably the qubits are arranged such that the CNOT operation is able to be realised on any given pair of (e.g. adjacent) qubits, with a connection therebetween, that corresponds to a pair of nodes connected by a (directed) edge, wherein the "control" qubit for the CNOT operation corresponds to the source node (having an outgoing edge) and the "target" qubit for the CNOT operation corresponds to the target node (having an incoming edge).

There may be any suitable arrangement of the qubits and the network of nodes (and their respective connections and edges), subject to there being two qubits which are not directly connected to one another. The qubits may be arranged in a square (e.g. N by N) grid of qubits and nodes respectively, or in a "honeycomb" lattice, e.g. in which the pattern of connections trace a repeating pattern of hexagons, in a repeating lattice of squares and octagons, or any similar 2D tiled pattern, or indeed a non-repeating 2D pattern. The qubits may be arranged in a 3D pattern, or any other arrangement (including a network having no defined structure) in which there are two qubits which are not connected directly to one another and for which a suitable linear network code can be provided. The array of qubits is preferably arranged such that each node of the network corresponds only to a single qubit of the array, and vice versa.

There may be any suitable and desired number of qubits in the array and corresponding nodes in the network. Preferably there are greater than 10 qubits and greater than 10 nodes, e.g. greater than 50 qubits and greater than 50 nodes, e.g. greater than 100 qubits and 100 nodes, e.g. greater than 1000 qubits and 1000 nodes, e.g. greater than 10000 qubits and 10000 nodes.

There may be any suitable and desired number of connections between the qubits in the array and corresponding edges between the nodes in the network. This may depend, for example, on the (topological) arrangement of the array and network. Preferably the transmitter nodes (and corresponding qubits) have between 1 and 4 outgoing edges (and corresponding connections) connected thereto. Preferably the receiver nodes (and corresponding qubits) have between 1 and 4 incoming edges (and corresponding connections) connected thereto. Preferably the relay nodes (and corresponding qubits) have between 2 and 8 edges (and corresponding connections) connected thereto. Preferably each node has the same number of incoming and outgoing edges connected thereto.

The array of qubits and the network of nodes are preferably arranged such that classical information may be transmitted freely, without being constrained to the network. Preferably the communication signals and the computations used to implement the method of the present invention are performed with classical information.

Preferably the associated control system(s) (e.g. as outlined below), which determine the operations performed on the qubits, are configured to do one or more (e.g. all) of: record, aggregate and compute parities of measurement outcomes of the qubits. Preferably the latency of the associated control system(s), e.g. when aggregating these measurement outcomes and/or performing parity computations on them, is low in comparison to the amount of time required to transmit quantum information through the network of qubits. Preferably the outcomes of such parity computations can be quickly deployed by the associated control system(s), to control operations which are performed at other qubits in the network with low latency, in comparison to the time required to transmit quantum information through the network of qubits.

Preferably the associated control system(s) are configured to perform these operations (e.g. transmit communication signals and perform computations) without being subject to any restrictions that may result from interactions between the qubits of the array.

When implementing the method of the present invention, using the array of qubits and the network of nodes, preferably the operations that are performed (e.g. between adjacent pairs of qubits), in order to perform the overall operation or operations on two or more qubits of the array, are performed to establish quantum entanglement between the quantum states of multiple pairs of qubits in the array. Preferably the overall operation to be performed (e.g. by performing individual operations on qubits and (e.g. adjacent) pairs of qubits) comprises an operation between multiple pairs of qubits that are remote from each other in the array (i.e. two qubits that are not adjacent and so do not have a direct connection therebetween; and several other pairs of qubits subject to such a condition). Preferably the individual operations comprise a plurality of quantum entanglement operations on the quantum states of a plurality of different pairs of qubits in the array.

Preferably the qubits of the array of qubits are arranged such that unitary transformations (e.g. X and Z Pauli rotations) and measurements (e.g. in the $|0\rangle$, $|1\rangle$ basis and in the $|+\rangle$, $|-\rangle$ basis) are able to be realised on the qubits. Preferably the qubits of the array of qubits are arranged such that a plurality of single-qubit operations acting on a plurality of different single qubits may be performed in parallel (e.g. simultaneously), and such that a plurality of CNOT operations acting on non-intersecting pairs of qubits (i.e. so that no two CNOT operations act on any qubit in common) may be performed in parallel (e.g. simultaneously).

In preferred embodiments, in terms of the quantum operations that are performed on the qubits of the array, the method and system only involves the preparation of $|0\rangle$ and $|+\rangle$ states, the use of CNOT gates between connected pairs of qubits (along the edges of the network), the use of unitary Pauli gates and measurements of the observables X and Z. Thus preferably the quantum information processing system comprises a stabiliser circuit.

Preferably the quantum information processing comprises a control system (or a plurality of control systems, e.g. configured to work together in a coordinated manner as a single aggregated control system) for determining the operations to perform on the qubits, e.g. based on the linear network coding solution. Preferably the control system is arranged to communicate classical information, e.g. to perform parity computations, for controlling the quantum information processing system (e.g. when and where operations are to be performed).

Preferably the control system is arranged such that the classical information is not restricted to the network of the quantum information processing system. Preferably the control system is arranged such that the classical information is able to be communicated with less latency than quantum information could be routed through the network. Preferably the classical information (e.g. the parity computations) is arranged (e.g. able) to be communicated (e.g. performed) over larger distances than the quantum operations between the qubits are able to be performed.

The time ordering of the plurality of nodes of the network, which provides a schedule (rota) of the order in which the plurality of qubits are to be operated on, may be provided in any suitable and desired way. The (e.g. description of a) time ordering of the plurality of nodes is therefore provided as an input to the method of the present invention. The schedule may be represented by integers, e.g. 1, 2, 3, . . . , etc., up to (and including) a particular limit "A", where A is greater than 1. This indicates the time order in which the plurality of nodes of the network are to be considered, according to the method of the present invention. Each integer may be known as a "time-slot".

The time ordering of the plurality of nodes, which is to be provided to the procedure, may be determined in any suitable way. Preferably the time ordering of the plurality of nodes is determined such that two nodes may share the same integer under the time ordering, only if they are not adjacent (i.e. connected directly by an edge) in the network. This time ordering results, according to embodiments of the method of the present invention, in a schedule that co-ordinates the way in which entanglement is distributed between adjacent nodes, without requiring a chain of two-qubit operations to realise that distribution process.

A node is described as being scheduled "earlier" than another node if the time order of the node (i.e. having an integer "j" assigned to the node is earlier than the time order of the another node (i.e. such that the integer "j" is less than the integer "k" assigned to the another node).

The time ordering of the plurality of edges of the network, which provides a schedule (rota) of the order in which pairs of qubits are to be operated on, may be provided in any suitable and desired way. The (e.g. description of a) schedule for the time ordering for the plurality of edges of the network is therefore provided as an input to the method of the present invention. The schedule may be represented by integers, e.g. 1, 2, 3, . . . , etc., up to (and including) a particular limit "B", where B is greater than 1. This indicates the time order in which pairs of nodes of the plurality of nodes of the network are to be considered, according to the method of the present invention. Each integer may be known as a "time-code".

The time ordering of the plurality of nodes, which is to be provided to the procedure, may be determined in any suitable way. Preferably the time ordering of the plurality of edges of the network is determined such that two edges that have a common relationship to a node (either two outgoing or two incoming edges) do not have the same position (e.g. integer) according to the time ordering. Expressed alternatively, preferably the time ordering of the plurality of edges of the network is determined such that any two edges that have the same position (e.g. integer) according to the time ordering do not have a common relationship to a node (i.e. they do not have the same source node or the same target node).

Such a time ordering is described as "conflict-free". This means, for example, that any pair of incoming edges or any pair of outgoing edges that are common to a node have different time orderings associated with them. It also means that a pair of nodes that are connected by an edge have the same time ordering as the edge.

This time ordering results, according to embodiments of the method of the present invention, in a schedule for which, at any one time, any particular node is only able to be involved in one operation with another node. For example, the time ordering prevents an operation being performed on nodes A and C if an operation is being performed on nodes A and B at that time.

Before any operations are performed on the plurality of qubits of the array, the state of each of the plurality of qubits is initialised, preferably after the time ordering of the nodes (and, e.g., the edges) has been determined. The plurality of qubits may be initialised in any suitable and desirable way.

In one embodiment the qubits which are at nodes that are not the sources of any directed edges are initialised to the quantum state $|0\rangle$, the qubits which are at nodes that have an incoming edge from a node having an earlier time ordering are initialised to the quantum state $|0\rangle$, and the remainder of the qubits are initialised to the quantum state $|+\rangle$. Thus, in particular, the transmitter nodes are each initialised to the quantum state $|+\rangle$. In other embodiments, a different basis may be chosen to which the quantum states that the plurality of qubits are initialised.

The linear network coding solution, for performing an operation or operations between the quantum states of two or more qubits of the plurality of qubits, may be provided in any suitable and desired way. The linear network coding solution provides a sequence of communication acts between the nodes of the network, thus providing a description of how the network is to be used. The (e.g. description of a) linear network coding solution is therefore provided as an input to the method of the present invention. The linear network coding solution may comprise a communications protocol for disseminating "classical" (conventional, non-quantum) information through a network.

In terms of the network, and the communication acts that the linear network coding solution sets out, preferably the linear network coding solution comprises a list of nodes in the network which are "transmitters", a list of nodes which are "receivers", and a list of nodes which are "relay" nodes.

In the network, preferably the (directed) edges connect a pair of nodes that are involved in a communications act according to the linear network coding solution. In this communications act, the node that sends a message in the communications act is the "source" node and the node that receives the message is the "target" node. An "outgoing" edge refers to the directed edge going out from a source node and an "incoming" edge refers to the directed edge coming in to a target node.

Transmitter nodes are those which only send outgoing messages. Receiver nodes are those which only receive incoming messages. Thus transmitter nodes only have outgoing directed edges from them and receiver nodes only have incoming directed edges to them. Relay nodes have both incoming and outgoing directed edges.

Preferably the linear network coding solution describes how particular information may be transmitted (e.g. collectively) from the transmitter nodes to the receiver nodes, e.g. via the relay nodes. Preferably the linear network coding solution comprises a schedule of one-way (directed) communication acts from nodes of the network to other nodes which are adjacent in the network. Thus preferably the communication acts only act in one direction, and preferably the directed edges of the network are arranged to control this. Preferably each communication act comprises one node sending a message to one other (adjacent) node.

Preferably the linear network coding solution is arranged (e.g. formulated) such that the communication acts are ordered (e.g. according to the time ordering of the nodes and edges), such that no node receives an incoming message after it has sent an outgoing message.

Preferably each message comprises a single bit of information (e.g. either a 0 or a 1). Preferably the linear network coding solution is arranged (e.g. formulated) such that each node in the network is involved in a maximum of one communication act with any particular other (e.g. adjacent) node in the network. Thus preferably each directed edge in the network is only used once. This does not prevent nodes in the network being involved in different communication acts with different nodes. For example, node A is allowed to be involved in a maximum of one communication act with node B, and node A is allowed to be involved in a maximum of one communication act with node C.

Preferably the linear network coding solution is arranged (e.g. formulated) such that outgoing messages which are sent by relay nodes are computed as the sum (modulo 2, i.e. the parity) of all of the incoming messages to any particular relay node. Preferably the same outgoing messages are sent from a node (e.g. transmitter and relay nodes) to each of the (adjacent) nodes with which it is connected (by an outgoing directed edge).

The linear network coding solution may be determined in any suitable and desired way. In one embodiment the quantum information processing system comprises a compiler arranged to determine (e.g. look up) the linear network coding solution for a particular operation to be performed on the array of qubits, e.g. on a particular set of pairs of qubits of the array.

The quantum information processing system may take the linear network coding solution and determine the operations to perform in any suitable and desired way. In one embodiment the (e.g. quantum information processing system comprises a) compiler is arranged to convert the (classical) linear network coding solution into (a set of) quantum operations. Preferably the quantum operations determined by the compiler, for the linear network coding solution, is expressed as a sequence of quantum instructions (e.g. with classical control, based on the quantum measurement outcomes) for executing by the quantum information processing system to perform the quantum operations.

Thus, in a preferred embodiment, the compiler receives a machine code set of instructions (e.g. through which an operation to be performed by the quantum information processing system is expressed), the compiler interprets the machine code and determines (e.g. looks up) a linear network coding solution for the operation to be performed on the array of qubits, and the compiler converts the linear network coding solution into a set of quantum operations.

Once the linear network coding solution and the time orderings of the nodes and the edges have been established, the quantum operations on the qubits, according to the linear network coding solution and the time orderings, are performed. This compiles the sequence of operations (e.g. represented as a set of instructions in a quantum programming language) from these inputs. The time orderings provides the ordering in which the local operations on single qubits at nodes (e.g. making a measurement) and the operations on pairs of adjacent qubits connected by edges of the network are to be performed. Preferably the operation that is performed (between the quantum states of the pair of qubits that are connected by the connection corresponding to the outgoing edge) is a CNOT operation. Preferably the CNOT operation that is performed for a source qubit "q" and a target qubit "r", that are at nodes connected by a directed edge "e" from "q" to "r", is a CNOT operation with a control "q" (i.e. the source qubit) and a target "r" (i.e. the target qubit "r").

Preferably, all of the operations associated with a particular time ordering (i.e. position (integer) in the time ordering) for the nodes may be performed simultaneously. This is because, when multiple operations are to be performed for a particular time ordering, the operations involve distinct pairs of qubits.

For the step of the method that comprises realising a measurement of the quantum states of the qubits, preferably this step is performed as part of a "termination" subroutine in which each of the qubits for which the measurement is being realised or simulated is "terminated". For each qubit (for which a measurement is being realised or simulated) the termination subroutine comprises realising or simulating a (X basis) measurement of the quantum state of the qubit (to be terminated) in the $|+\rangle$, $|-\rangle$ basis.

In the case of an X basis measurement, it may be necessary to perform some Z operations on other qubits (i.e. not the qubit being terminated). Preferably, for each qubit being terminated (for which a measurement is being realised or simulated) for which the measurement outcome is $|-\rangle$, the termination subroutine comprises performing Z corrections (measurements) on one or more of the other qubits of the array, such that the post-measurement state of the qubit is that which would have been realised if the measurement outcome had instead been $|+\rangle$. Preferably the method comprises determining on which qubits to perform Z basis measurements, in order to perform these Z corrections to realise the desired measurement outcome.

At the end of this termination subroutine, the terminated qubit should be in the $|+\rangle$ state. However, a qubit being terminated is not (yet) in the $|+\rangle$ state, a further operation on the terminated qubit may need to be performed to transform the terminated qubit into the $|+\rangle$ state, according to the termination subroutine. Such a further operation may be performed in parallel with the (Z correction) operations outlined above.

The termination subroutine for a qubit may comprise one or more (e.g. all) of the steps outlined below, following the description of the drawings.

In one embodiment the method comprises performing a "delayed signal correction" on the nodes of the network. The delayed signal correction substitutes transmission of correlations by CNOT operations on the array of qubits, with transmission of classical correlations on the nodes of the network. This is possible owing to the low-latency operations of the classical control system (i.e. network), compared to the CNOT operations and measurements that are performed on the array of qubits.

Preferably the delayed signal correction comprises, for each relay node, defining a hypothetical measurement result variable $y_q$ (e.g. taking the value 0 or 1); for each transmitter node, defining the hypothetical measurement result variable $y_q$ as having the value 0; for each node ("q"), defining a delayed signal correction formula $w_q$ as the sum (e.g. modulo 2) of $y_r$ and $w_r$, for nodes "r" that have incoming edges to the node (q). When there are no such incoming edges (e.g. for transmitter nodes) $w_q$ is defined as 0.

Owing to the restrictions on the ordering of the communication acts in the linear network coding solution (as set by the scheduling of the nodes and the edges therebetween), this delayed signal correction provides a well-defined formula for each node q. The formula may be expanded in terms of the measurement outcomes, $y_r$, of various relay nodes r (substituting $y_t=0$ for all transmitter nodes t).

For any particular receiver node q, the delayed signal correction formulae may be determined prior to the method (i.e. including the quantum operations) being performed. When the method is performed, these formulae may then be evaluated for particular measurement outcomes $y_r$, such that they may be used to control the operations to be performed at the node q. For any particular measurement outcomes $y_r$ at the relay nodes r, the value of $w_q$ is the delayed signal correction for the node q.

The methods in accordance with the present invention may be implemented at least partially using software, e.g. computer programs. It will thus be seen that when viewed from further embodiments the present invention provides computer software specifically adapted to carry out the methods herein described when installed on a data processor (e.g. of a quantum information processing system), a computer program element comprising computer software code portions for performing the methods herein described when the program element is run on a data processor (e.g. of a quantum information processing system), and a computer program comprising code adapted to perform all the steps of a method or of the methods herein described when the program is run on a data (e.g. quantum information) processing system. Thus the invention extends to a computer readable storage medium storing computer software code which when executing on a data (e.g. quantum information) processing system performs the methods described herein.

The present invention also extends to a computer software carrier comprising such software arranged to carry out the steps of the methods of the present invention. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the present invention need be carried out by computer software and thus from a further broad embodiment the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible, non-transitory medium, such as a computer readable storage medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

BRIEF DESCRIPTION OF THE DRAWINGS

An embodiment of the invention will now be described, by way of example only, with reference to the accompanying drawings in which.

DETAILED DESCRIPTION

Figure 1:
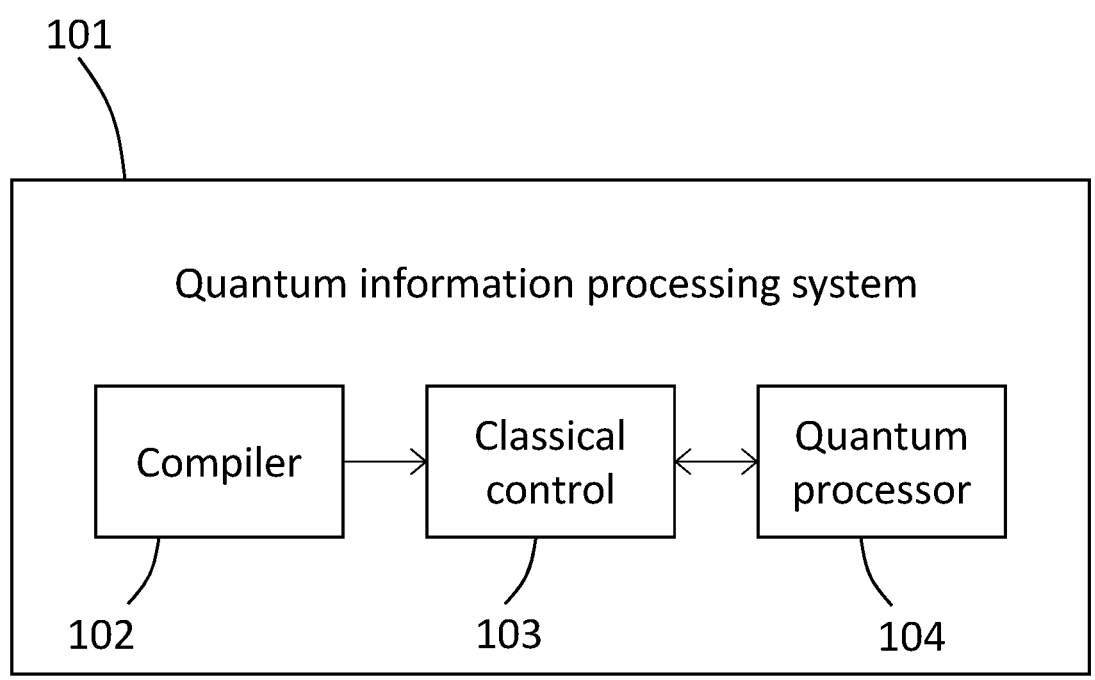
FIG. 1 shows a quantum information processing system according to an embodiment of the present invention.

Quantum information processing systems exploit quantum mechanical phenomena such as superposition and entanglement to perform data processing calculations. In order to provide a large scale system, capable of performing useful calculations, a network of multiple qubits need to be provided. This brings the challenge of performing calculations between qubits that may be remote from each other, which is often prevented by quantum decoherence. Embodiments of the present invention that seek to provide improved methods for quantum information processing will now be described.

Entanglement is a form of quantum correlation that is useable in many different ways in quantum information processing. In particular, for two qubits A and B which are distant from one another, it is possible to perform a two-qubit operation between A and B, if there is a qubit A' which is near to A and a qubit B' which is near to B, which that A' and B' share entanglement, and if it is possible to perform two qubit operations directly between A and A' and between B and B', and if the classical information of measurement outcomes on A' and B' can be transmitted quickly to either A or B. In this way, the entanglement between two systems close together can be exploited to extend entanglement interactions across a network to mediate an interaction between two remote systems in the network. In turn, for a network of multiple systems (e.g. qubits), this allows information to be distributed over the network while maintaining quantum coherence.

Embodiments of the present invention provide a method of distributing entanglement concurrently between many pairs of systems $(A_1,B_1)$, $(A_2,B_2)$, ... $(A_m,B_m)$ for some integer m>1, where the systems $A_j$ and $B_j$ each store a single qubit of quantum information. Furthermore, the network of the systems is such that (owing to the particular quantum hardware of the qubit systems) there are restrictions on which pairs of systems are able to interact directly with each other. This prevents remote systems in the network interacting directly, for example. Such interactions must be mediated between intermediate qubit systems.

More generally, embodiments of the present invention provide a scheme of generating entanglement procedures for the qubit systems of the network from an input specification comprising a "linear network coding solution".

Embodiments take, as an input, a description of a linear network coding solution. A linear network coding solution is a communications protocol for disseminating "classical" (conventional, non-quantum) information through a network. In the present embodiments, such a linear network coding solution comprises a list of nodes in the network which are "transmitters", a list of nodes which are "receivers" and a list of "relay" nodes. The nodes of the linear network coding solution, taken as this input, correspond to the different systems (qubits) in the hardware platform (network).

The linear network coding solution describes how certain information may be transmitted collectively from the transmitters to the receivers, by a schedule of one-way communication acts from nodes to other nodes which are adjacent in the network. Each communication act comprises one node sending a message to one other node. The messages are each a single bit, which may be either 0 or 1.

The method according to embodiments of the present invention requires a description of such a linear network coding solution, in which:
- every node is involved in at most one communication act with any other given node;
- the nodes which are "transmitters" are those nodes which only send outgoing messages;
- the nodes which are "receivers" are those nodes which only receive incoming messages;
- the nodes which are "relays" are those nodes which both receive incoming messages and send outgoing messages;
- the communications acts are ordered so that no node receives an incoming message after it has sent an outgoing message;
- the outgoing messages which are sent by each relay node r, are computed as the sum modulo 2 (i.e. the parity) of all of the incoming messages to the node r.

A "directed edge" of the network refers to a pair of nodes that are involved in a communications act, where the node which sends a message in that communications act is called the "source" and the node which receives the message is called the "target". Thus, a node may be referred to as an "outgoing edge" for a directed edge for which the node is a source; and node may be referred to as an "incoming edge" for a directed edge for which the node is a target.

The linear network coding solution is supplemented with a "time-coding" of the directed edges. This assigns to each directed edge a time-code ranging over integers 1, 2, ... up to (and including) some limit "B" that is greater than 1. Of these time-codes, any pair of directed edges that have the same time-code do not have either the same source node or the same target node. A time-coding which satisfies this requirement is called "conflict-free". There are ways to verify whether a time-code is conflict free, and ways to produce such a conflict-free time-coding of the messages, both of which are known to the skilled person.

Separately from the linear network coding solution and the time-coding, the method according to embodiments of the present invention also uses a proposed "schedule" of the nodes. This schedule assigns time-slots to each node, where the time-slots are represented by integers 1, 2, ... up to (and including) some limit "A" which is greater than 1. Two nodes may share the same integer under the schedule, only if they are not adjacent in the network. There are ways to produce such a schedule that are known to the skilled person. One node is described as being scheduled "earlier" than another if the integer "j" assigned to the former is less than the integer "k" assigned to the latter.

The method according to embodiments of the present invention provides a way to "compile" a sequence of quantum operations (e.g. represented as a set of instructions in a quantum programming language) from the input described above. The operations may be suitable for any hardware platform that has multiple qubits (e.g. network of qubits), where:
- the nodes of the network taken as the input correspond to qubits in the hardware platform, with directed edges in the network only between nodes that correspond to pairs of qubits, where a CNOT operation can be realised with the control qubit corresponding to the source node and the target qubit corresponding to the target node;
- it is possible to realise certain unitary transformations (X and Z Pauli rotations) and measurements (in the $|0\rangle$, $|1\rangle$ basis and in the $|+\rangle$, $|-\rangle$ basis) on the qubits; and single-qubit operations acting on different qubits may be performed in parallel, and CNOT operations on non-intersecting pairs of qubits may also be performed in parallel.

The hardware platform includes a control system that determines the operations to perform on each qubit. The control system can perform parity computations and has a low latency of processing this information relative to the time required to realise qubit measurements and two-qubit operations.

In summary, provided with a linear network coding solution, together with conflict-free time-codings of the directed edges and scheduling of the nodes, the method according to embodiments of the present invention generates a low-depth procedure to distribute entanglement from the transmitters to their corresponding targets, in a quantum architecture whose architecture includes a network of qubits located at nodes, where a pair of qubits located at nodes are connected in the network.

The procedure according to embodiments of the method of the present invention, will now be described with reference to the drawings.

FIG. 1 shows an embodiment of a quantum information processing system 101 on which embodiments of the method of the present invention may be implemented. The quantum information processing system 101 includes a compiler 102, a classical control system 103 and a quantum processor 104. The classical control system 103 is formed of a network of nodes (as will be shown in FIG. 2) and the quantum processor 104 is formed from an array of connected qubits (as will also be shown in FIG. 2).

For a particular operation to be performed on the array of qubits of the quantum processor 104 (e.g. received by the compiler as a machine code set of instructions through which the operation to be performed is expressed), the compiler 102 looks up the linear network coding solution for the operation. The compiler 102 then interprets the machine code and converts the classical linear network coding solution into a set of quantum operations, which is expressed as a sequence of quantum instructions (with classical control, based on the quantum measurement outcomes) for executing by the array of qubits of the quantum processor 104 to perform the quantum operations.

Figure 2:
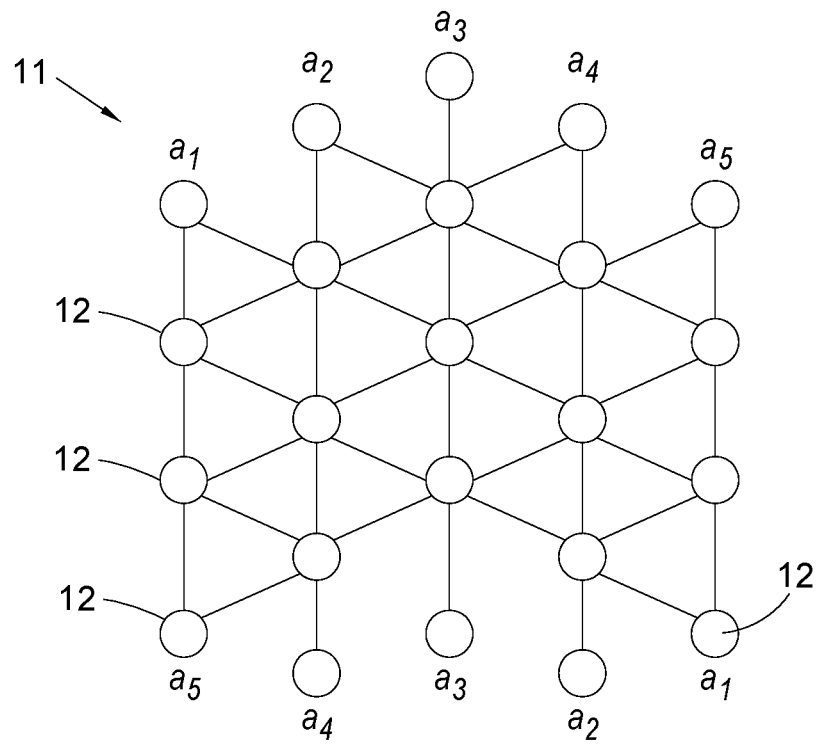
FIG. 2 shows a network of nodes according to an embodiment of the present invention.

FIG. 2 shows a network 11 of nodes 12, with edges connecting these nodes. The nodes 12 form the nodes of a network (e.g. of the classical control system 103 shown in FIG. 1) on which a linear network coding solution is applied but also correspond to the location of qubits of a hardware platform (e.g. of the quantum processor 104 shown in FIG. 1), e.g. of a quantum information processing system. This quantum network graph that the network represents has edges for which a CNOT operation is possible in either direction.

In this network 11 of nodes 12, it is desired to share a Bell pair (i.e. maximally entangle the quantum states of the qubits) between each pair of nodes 12 with the same label ($a_1$, $a_2$, $a_3$, $a_4$, $a_5$). It can be seen that these pairs of nodes 12 are non-adjacent and are remote from each other on opposite sides of the network 11.

It should be noted that the labelling of the nodes (as shown in FIGS. 3 to 21), which is inherited directly from classical binary network coding, has a direct correspondence in general to the quantum operations of the present invention that are to be performed, and not just to those of the embodiment described with reference to the Figures.

Figure 3:
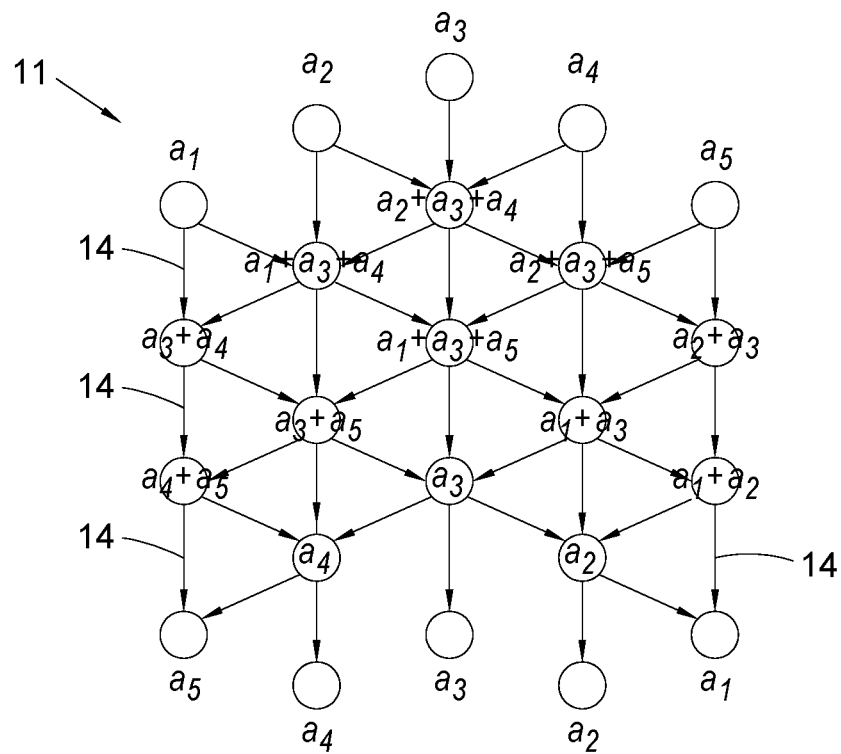
FIG. 3 shows a classical linear network coding solution for the network shown in FIG. 2.

FIG. 3 shows a classical linear network coding solution that achieves the desired entanglement distribution. It should be noted that this is a directed acyclic graph and every node 12 accumulates all of its inputs before forwarding outputs. It should be noted that the addition shown in FIG. 3 (and all the subsequent Figures) is always modulo 2. The linear network coding solution satisfies the requirements detailed above. FIG. 3 also shows the directed edges 14 between pairs of nodes 12.

The determination of the direction of the edges of the quantum network graph thus determines which direction to use the CNOT operations for each edge, i.e. given the linear network coding solution that is taken as the input.

Figure 4:
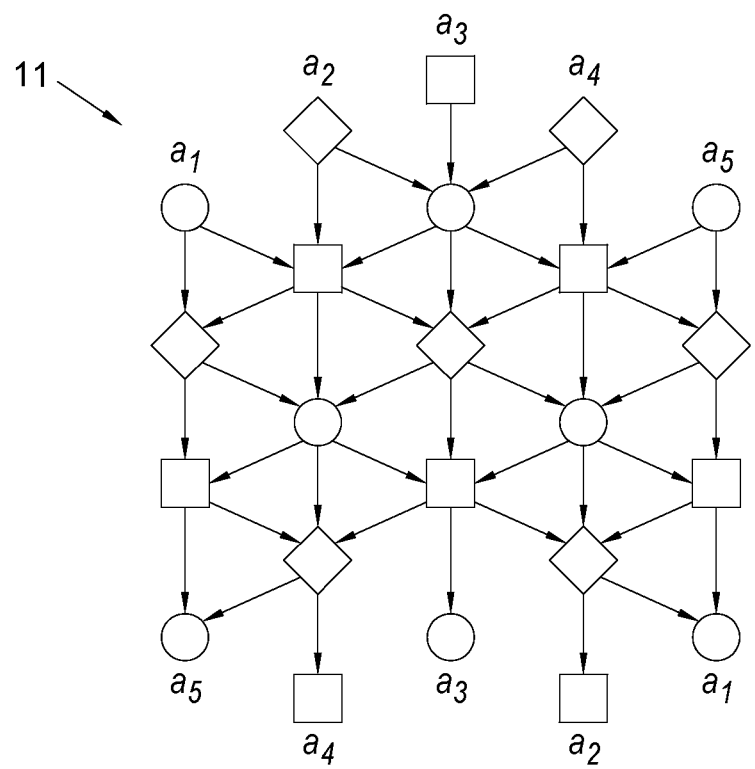
FIG. 4 shows a scheduling derived for the network shown in FIG. 2.

FIG. 4 shows a scheduling derived for the network 11, shown by the shapes of the nodes. The nodes are to be taken in the order: diamond, square, circle, where a diamond represents time-slot "1" in the schedule, a square represents time-slot "2" in the schedule and a circle represents time-slot "3" in the schedule.

It will be appreciated that although the scheduling that has been derived for this particular embodiment uses only three different types of nodes (corresponding to the three different shapes), the schedule for a different network may require more than three different types of nodes. When the schedule comprises four or more types of nodes, the procedure that is performed is the same as is described below for the three types of nodes, except that the part of the procedure described for the middle set of nodes (the square nodes) is repeated for each set of middle nodes (i.e. for sets 2, 3, ... n–1, as appropriate, where there are n sets of different types of nodes).

Figure 5:
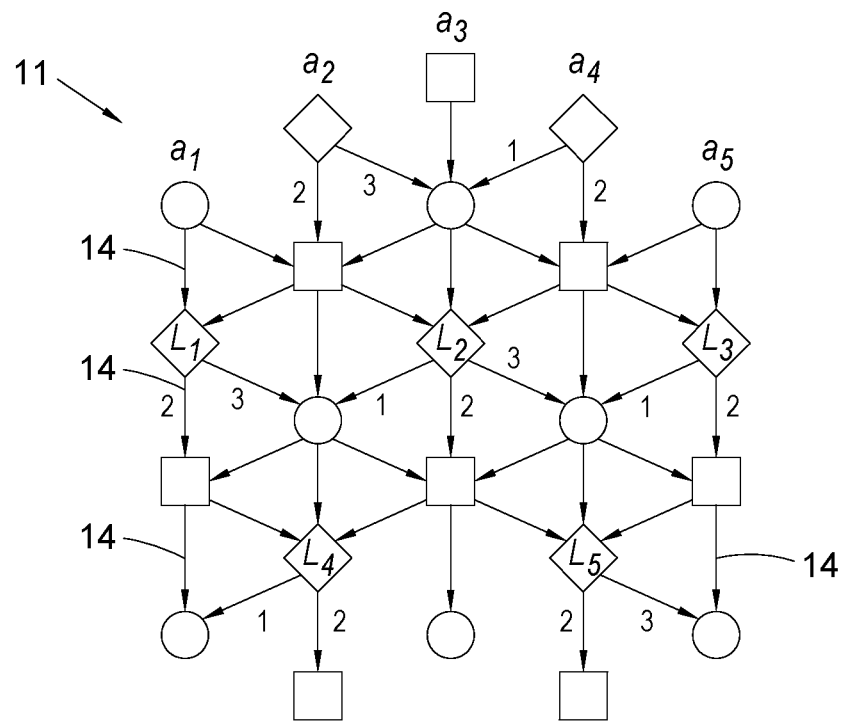
FIG. 5 shows a time-coding derived for the network shown in FIG. 2.

FIG. 5 shows a time-coding of the directed edges 14 between the nodes 12, labelled by the integers: 1, 2, 3 on the outbound edges. It should be observed that this time-coding is conflict free, i.e. any pair of directed edges that have the same time-code do not have either the same source node or the same target node.

Provided the classical linear network coding solution as shown and described, supplemented with the time-coding and the schedule as shown and described, the procedure of the method according to embodiments of the present invention may then be implemented, as will be described.

First, the state of the qubit at each node 12 is initialised in parallel. Those qubits at nodes that are not the sources of any directed edges 14 are initialised to the quantum state $|0\rangle$, those nodes having incoming messages from earlier scheduled nodes are also initialised to $|0\rangle$ and the remainder are initialised to $|+\rangle$. It can be seen, in FIG. 4 that taking the diamond nodes (the nodes with a time-slot "1") first, the nodes are initialised and labelled. These include those already labelled: $a_1$, $a_2$, $a_3$, $a_4$, $a_5$. Other diamond nodes are given new labels: $L_1$, $L_2$, $L_3$, $L_4$, $L_5$, as shown in FIG. 5.

Figure 6:
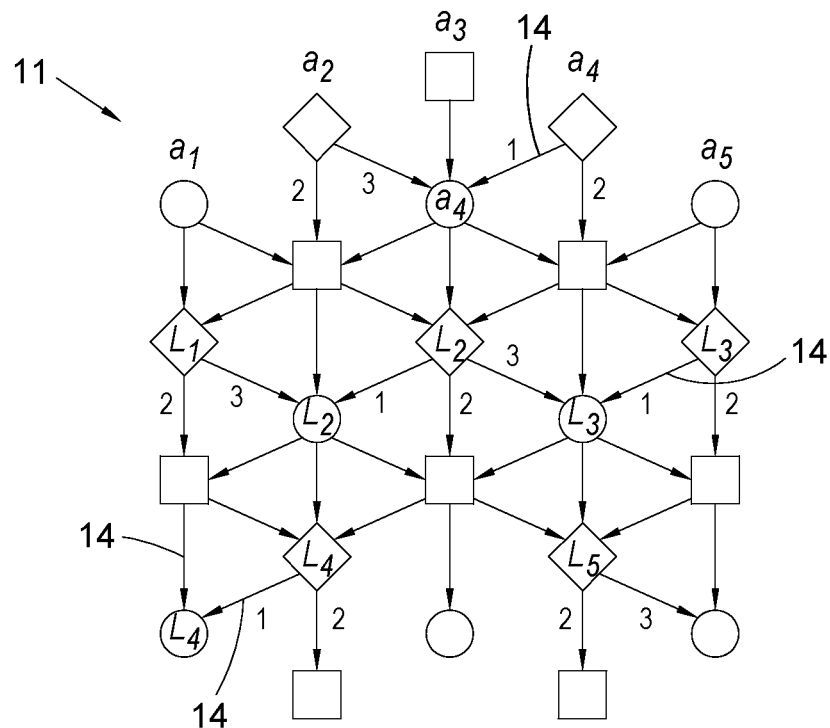
FIGS. 6 to 21 show the steps of a method of operating a quantum information processing system, using the network of FIG. 2, according to an embodiment of the present invention.
Figure 7:
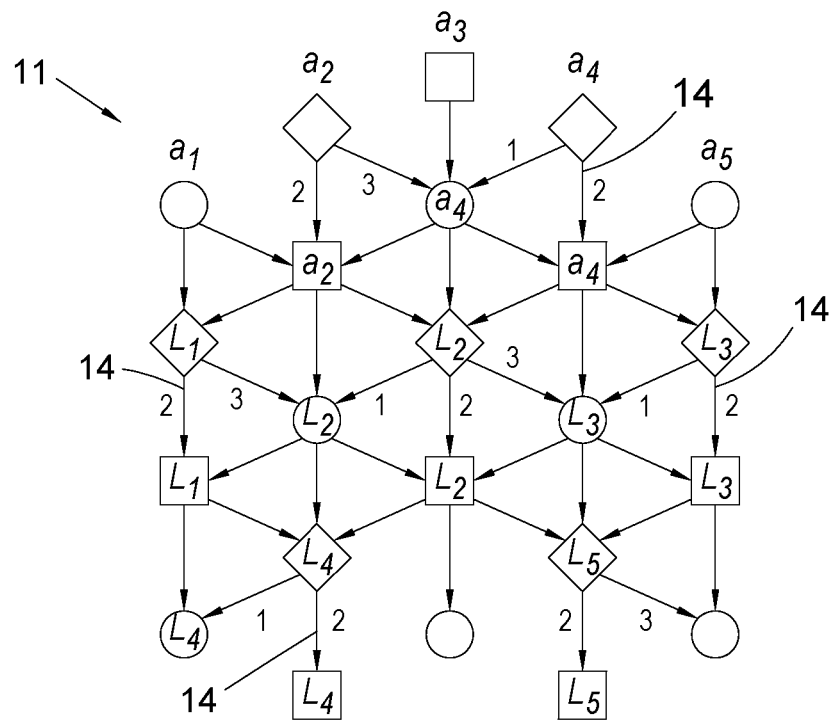

For each node "q" that is not a receiver node and which has been given a time-slot "1" (i.e. the diamond nodes including the nodes labelled $a_4$, $L_2$, $L_3$, $L_4$ in the network 11 shown in FIG. 6), a sequence of operations involving these nodes "q" is performed: iterating through the time-codes for the directed edges 14 in order, those directed edges which have that time-code, which have this source node "q" are considered.

For each such directed edge "e", a CNOT operation is performed with control node "q" and target node "r", where "r" is the qubit located at the node which is the target of the directed edge "e". All of the operations for directed edges 14 associated with a given time-code may be performed simultaneously, as they involve distinct pairs of qubits.

Thus, the directed edges having time-code "1" are considered first, as shown in FIG. 6. Then, the directed edges having time-code "2" are considered next, as shown in FIG.

Figure 8:
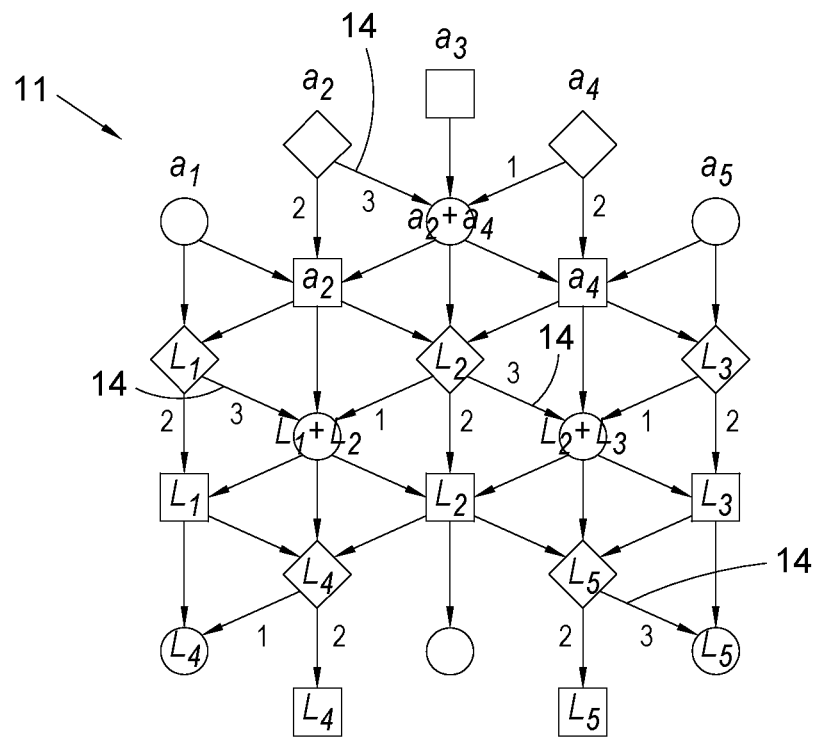

7. Then, the directed edges having time-code "3" are considered next, as shown in FIG. 8.

Next, as shown in FIGS. 9-15, operations are performed on all the qubits associated with nodes 12 that are not receiver nodes and which have been assigned time-slots "2", "3", . . . in order, up to A−1, where A is the limit of the number of time-slots. In the network 1 shown, A=3, so in this step operations are performed on all the qubits associated with nodes 12 that are not receiver nodes and which have been assigned the time-slot "2" (i.e. the square nodes including the node labelled $a_3$ in the network 11 shown in FIG. 9).

Figure 9:
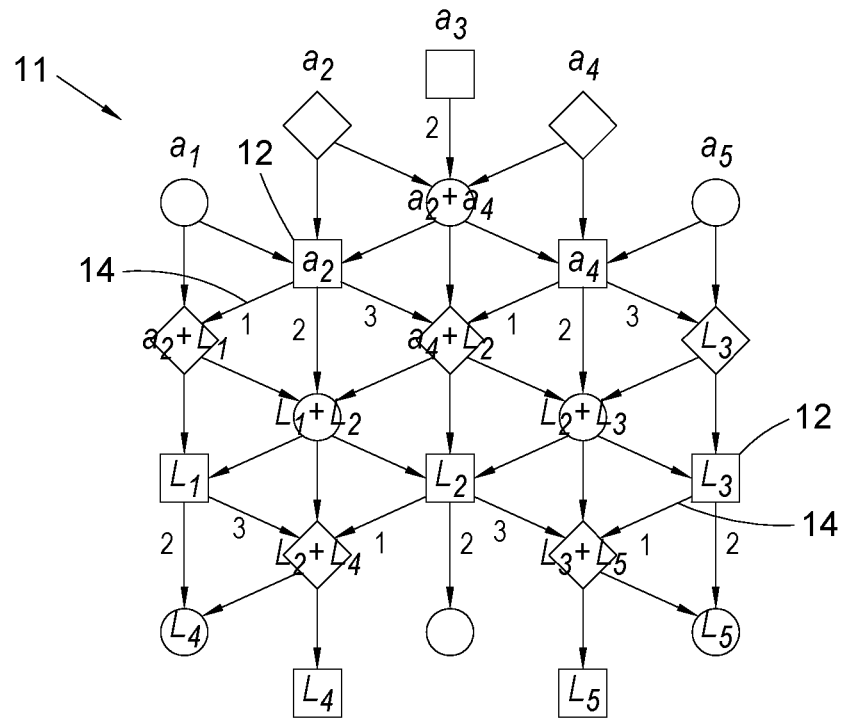

First, a conflict-free time-coding of the directed edges 14 between the nodes 12, labelled by the integers: 1, 2, 3 on the outbound edges, is established for the square nodes, as can be seen in FIG. 9. A similar procedure of CNOT transmission operations, as for the time-coding established for the diamond nodes, is then performed for the time-coding established for the square nodes.

For this (square) time-slot "t" in the schedule and a given node "q" which is assigned the time-slot "t", the following operations are performed:
  (i) Iterating through the time-codes for directed edges 14 in order, those directed edges which have that time-code and which have source node "q" are considered. For each such directed edge "e", a CNOT operation is performed with control node "q" and target node "r", where "r" is the qubit located at the node which is the target of the directed edge "e". All of the operations associated with a given time-code may be performed simultaneously, as they involve distinct pairs of qubits.

Figure 10:
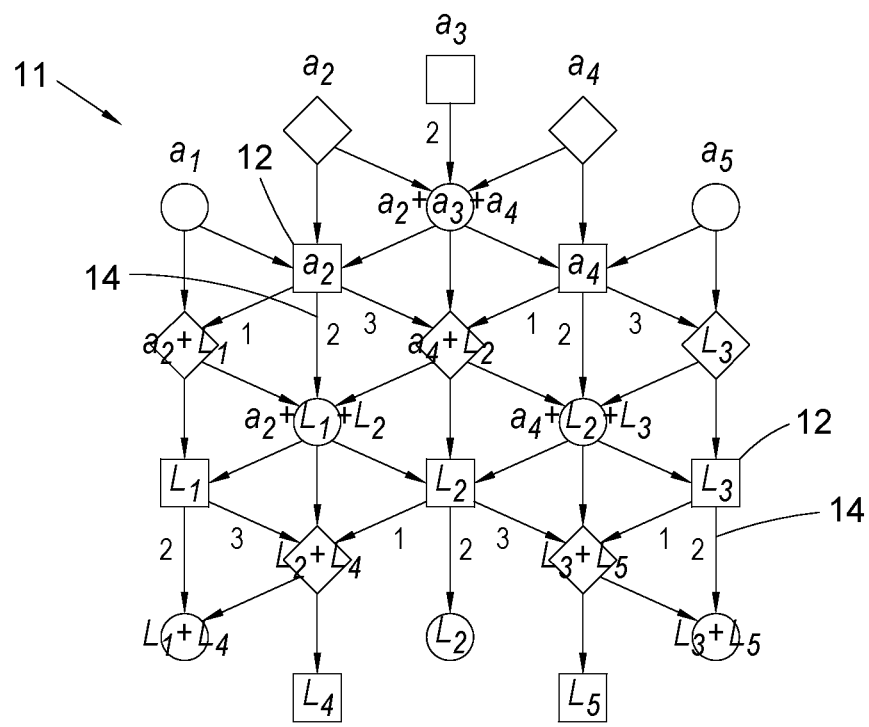
Figure 11:
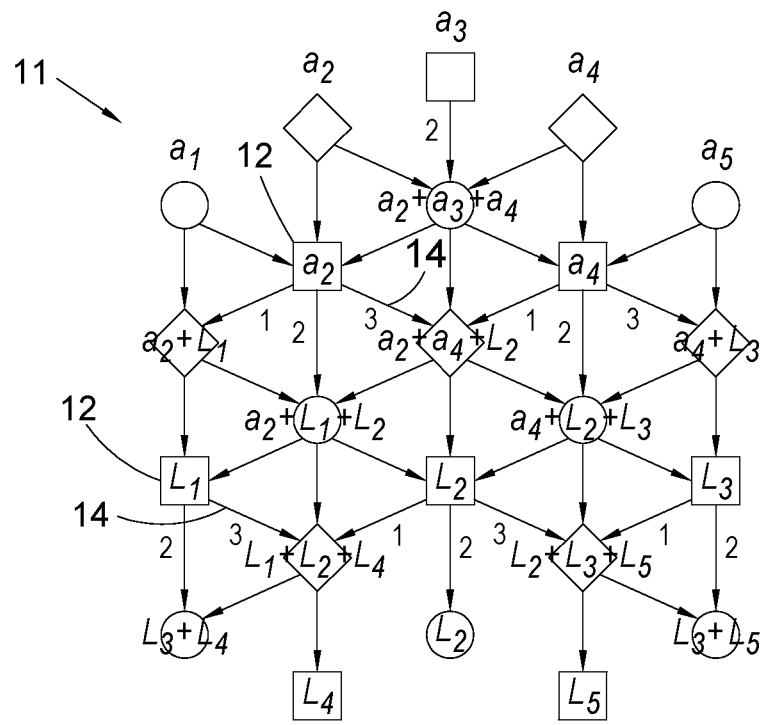

Thus, as shown in FIG. 9, the CNOT transmission operations are performed on the nodes 12 and directed edges 14 labelled with time-code "1". As shown in FIG. 10, the CNOT transmission operations are performed on the nodes and directed edges labelled with time-code "2". As shown in FIG. 11, the CNOT transmission operations are performed on the nodes and directed edges labelled with time-code "3".

Figure 12:
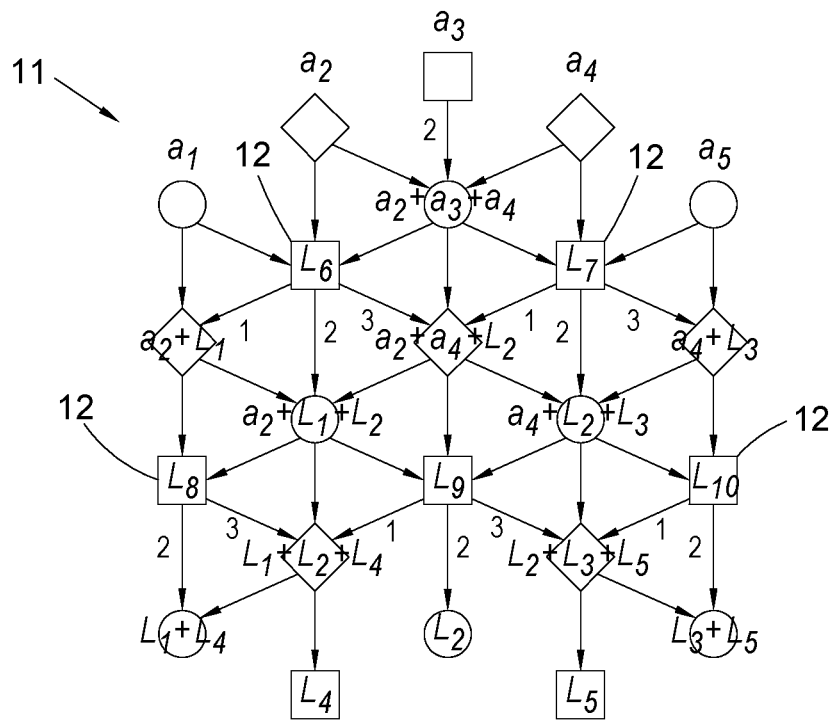

Following this, the next operation in the procedure for the square nodes is performed:
  (ii) If there is a node "p" that is assigned an earlier time-slot than node "q" (node "q" being a square node), and which sends a message to node "q" in the linear network coding solution, the qubit at node "q" is "terminated". To do this, a termination procedure (to implement a classical correction) and a measurement is required to be made. This termination subroutine is described in more detail below. This results in each node 12 that is not a transmitter node or a receiver node being given a new label. This is shown in FIG. 12.
Following this:
  (iii) If there is a node "u" which is assigned a later time-slot than node "q" (node "q" being a square node), and which sends a message to node "q" in the linear network coding solution, an additional CNOT operation is performed with control node "q" and targets "r", for those nodes "r" which are the targets of directed edges "e" whose source is node "p". These CNOT operations are performed in the same order as in step (i) above. This step of the procedure prepares such nodes "u" that are involved later in the process (i.e. at a subsequent timeslot), so that these node will be correctly setup for operations performed later on.

Figure 13:
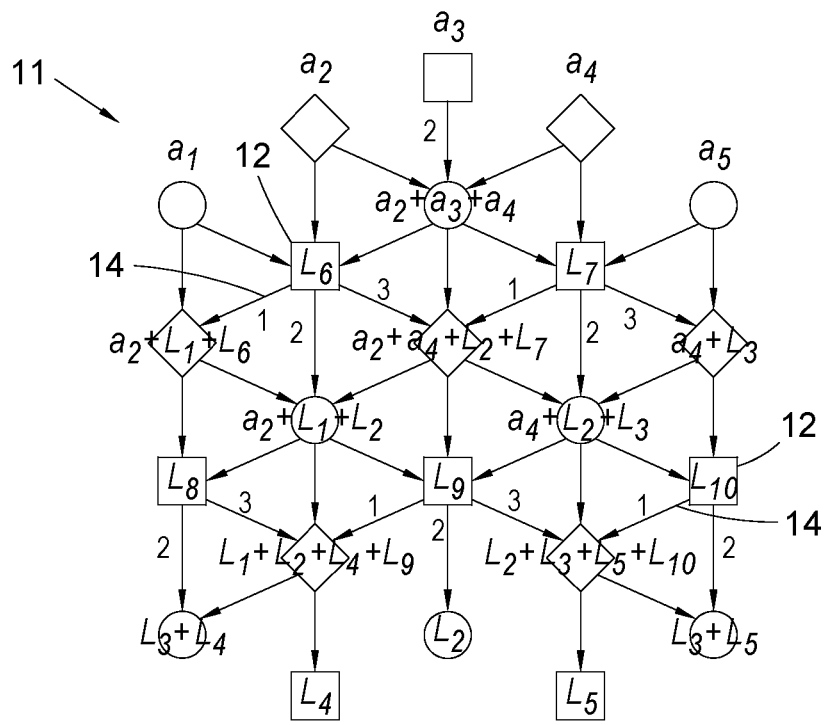
Figure 14:
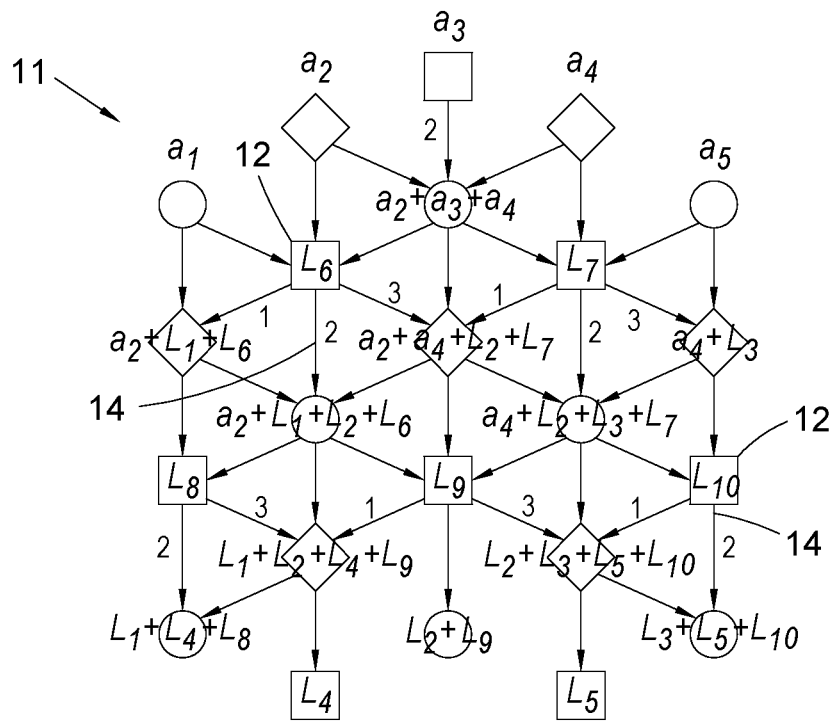
Figure 15:
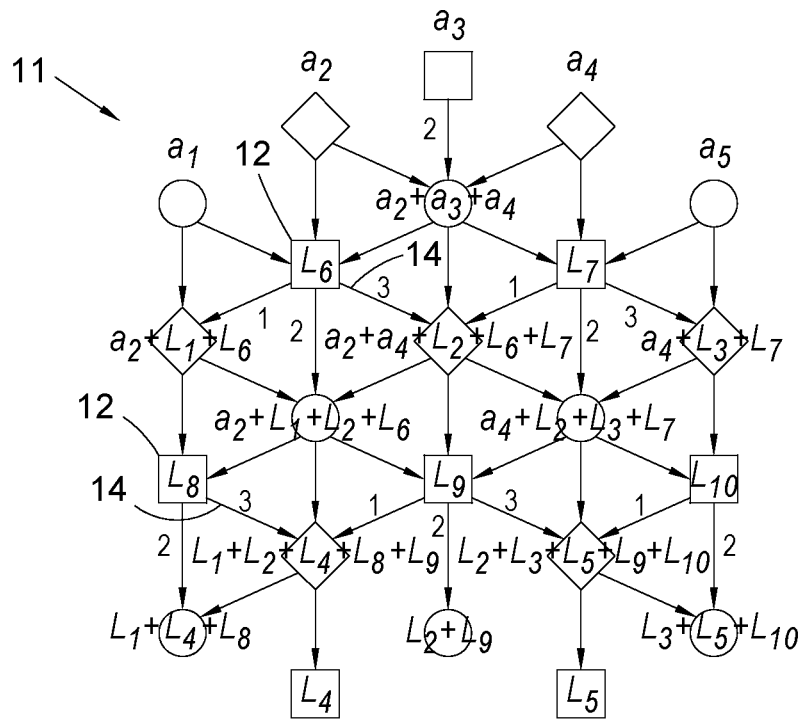

Thus, as shown in FIG. 13, the CNOT transmission operations are performed on the nodes 12 and directed edges 14 labelled with time-code "1", using the newly labelled nodes 12 from the termination subroutine. As shown in FIG. 14, the CNOT transmission operations are performed on the nodes and directed edges labelled with time-code "2". As shown in FIG. 15, the CNOT transmission operations are performed on the nodes and directed edges labelled with time-code "3".

Figure 16:
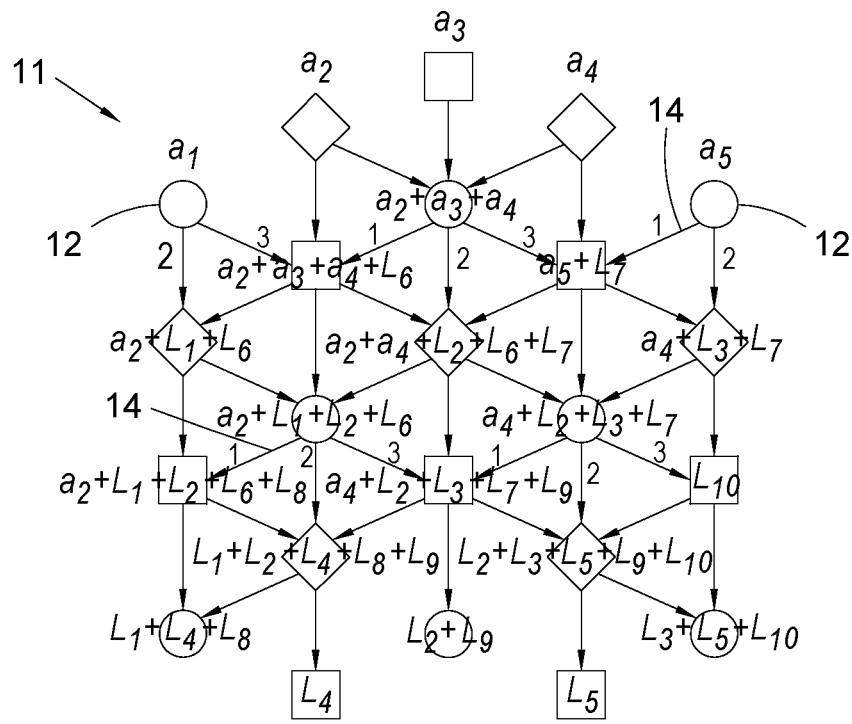
Figure 17:
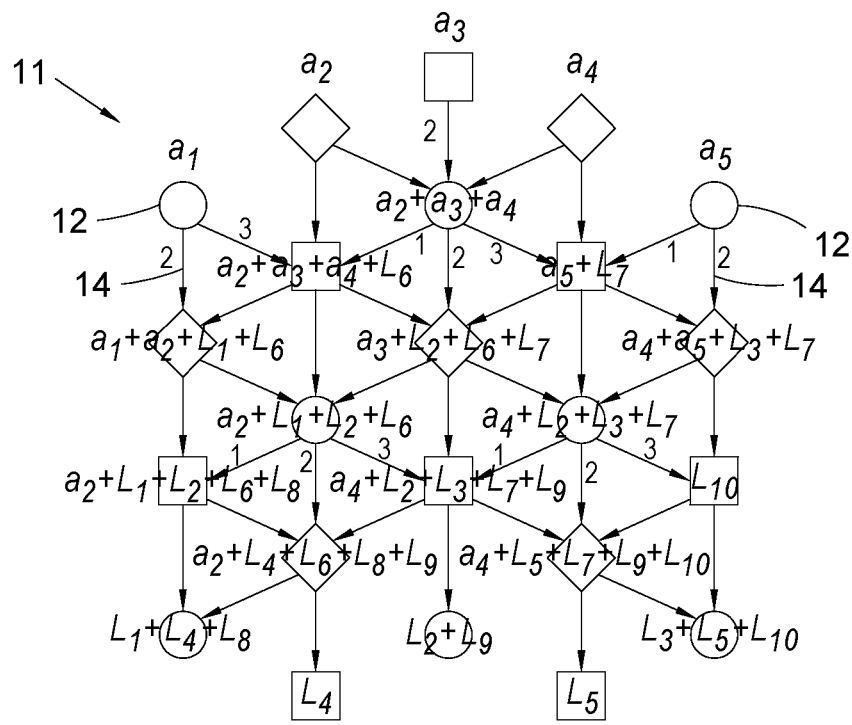
Figure 18:
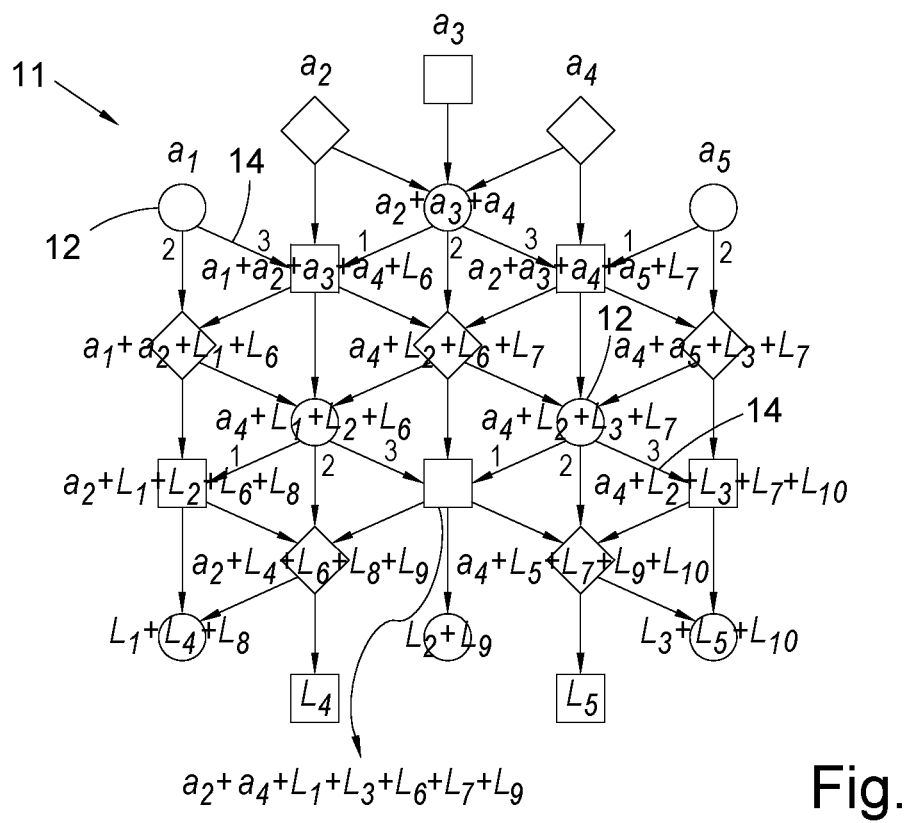

After the operations for these intermediate time-slots, as will be shown in FIGS. 16-18, operations are performed on all the qubits associated with nodes 12 that are not receiver nodes and which have been assigned the last time-slots. In the network 1 shown, A=3, so in this step operations are performed on all the qubits associated with nodes 12 that are not receiver nodes and which have been assigned the time-slot "3" (i.e. the circle nodes including the nodes labelled $a_1$ and as in the network 11 shown in FIG. 16).

First, a conflict-free time-coding of the directed edges 14 between the nodes 12, labelled by the integers: 1, 2, 3 on the outbound edges, is established for the circle nodes, as can be seen in FIG. 16. A similar procedure of CNOT transmission operations, as for the time-coding established for the diamond and square nodes, is then performed for the time-coding established for the circle nodes.

As shown in FIG. 16, for this (circle) time slot "t" in the schedule and a given node "q" that is assigned the time-slot "t", and which is also not a receiver node in the linear network coding solution, the following sequence of operations is performed: iterating through the time-codes for directed edges 14 in order, those directed edges which have that time-code and which have source node "q" are considered. For each such directed edge "e", a CNOT operation is performed with control node "q" and target node "r", where "r" is the qubit located at the node which is the target of the directed edge "e". All of the operations associated with a given time-code may be performed simultaneously, as they involve distinct pairs of qubits.

Thus, as shown in FIG. 16, the CNOT transmission operations are performed on the nodes 12 and directed edges 14 labelled with time-code "1". As shown in FIG. 17, the CNOT transmission operations are performed on the nodes and directed edges labelled with time-code "2". As shown in FIG. 18, the CNOT transmission operations are performed on the nodes and directed edges labelled with time-code "3".

Figure 19:
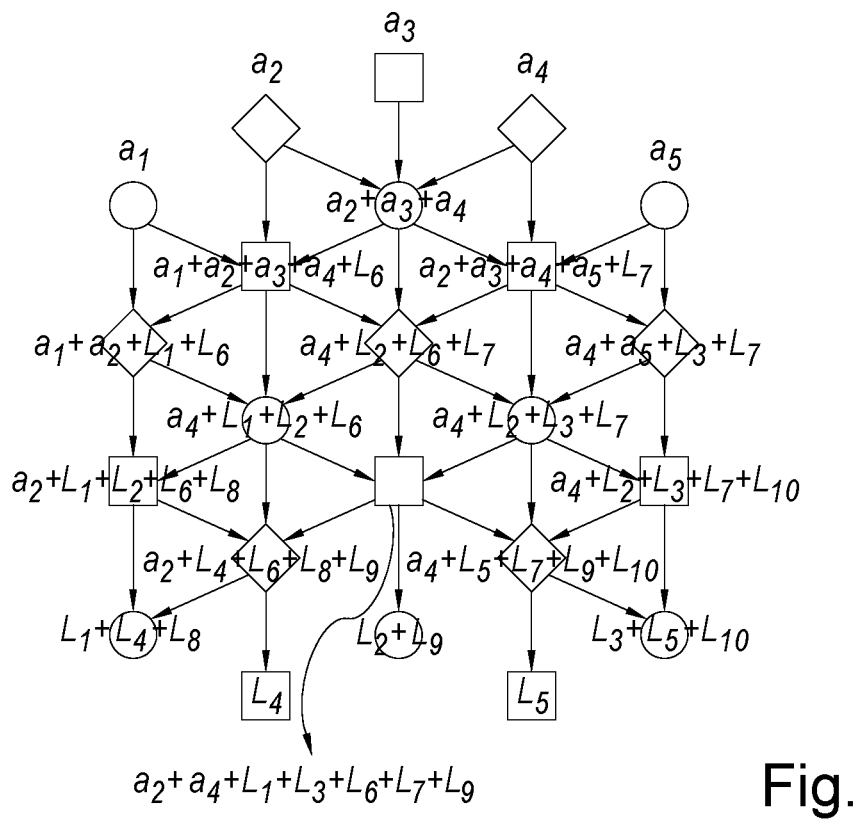

After these operations have been performed, a termination procedure (to implement a classical correction) is performed and a measurement is made, based on the values shown in FIG. 19 (the same as FIG. 18 but not showing the time-coding). All relay node qubits "q" (i.e. those which are not transmitter or receiver nodes) and which are assigned to a time-slot "A" (i.e. of the circle nodes) are terminated. The circle nodes are measured in the X basis. The termination subroutine is described below.

Concurrently, for all other relay qubits "r", the (red and square) qubits "r" are measured in the standard (Z) basis, recording the measurement outcome as $y_r$.

In parallel, for each qubit "q" at a receiver node, an X operation is performed, if $w_q=1$ and if qubit "q" is also not subject to a Z operation as a result of a termination for some other qubit. (If $w_q=1$ and qubit "q" is also subject to such a Z operation, a single $Z^v X^w$ operation may be performed instead of performing them separately.) This allows this step to be performed concurrently with the termination and measurement step.

The above procedure is a "delayed signal correction", where $w_q$ is defined for each node "q", as follows:
  For each relay node "q", a hypothetical "measurement result" variable $y_q$ is defined, which may take values 0 or 1. For transmitter nodes "q", the hypothetical "measurement result" variable is set to $y_q=0$.

For each node "q", $w_q$ is defined to be the sum modulo 2 of ($y_r+w_r$ is defined), for r ranging over all neighbours of q which are the sources of directed edges whose targets are q. If there are no such neighbours of r, the delayed signal correction is defined to be $w_q=0$.

Figure 20:
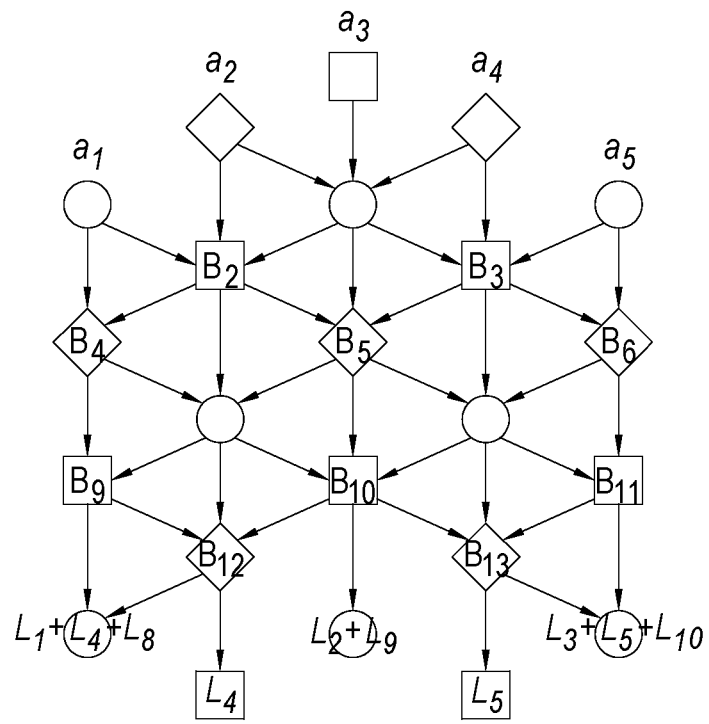

FIG. 20 shows the outputs, symbolised as outputs "B", for the measurement outcomes. This gives the following equations:

$$B_2=a_1+a_2+a_3+a_4+L_6$$

$$B_3=a_2+a_3+a_4+a_5+L_7$$

$$B_4=a_1+a_2+L_1+L_6$$

$$B_5=a_3+L_2+L_6+L_7$$

$$B_6=a_4+a_5+L_3+L_7$$

$$B_9=a_2+L_4+L_6+L_8+L_9$$

$$B_{10}=a_2+L_1+L_2+L_6+L_8$$

$$B_{11}=a_4+L_2+L_3+L_7+L_{10}$$

$$B_{12}=a_2+a_4+L_1+L_3+L_6+L_7+L_9$$

$$B_{13}=a_4+L_5+L_7+L_9+L_{10}$$

These equations can be rearranged to give:

$$L_1=a_3+a_4+B_2+B_4$$

$$L_2=a_1+a_3+a_5+B_2+B_3+B_5$$

$$L_3=a_2+a_3+B_3+B_6$$

$$L_4=a_4+B_3+B_5+B_6+B_9+B_{10}+B_{12}$$

$$L_5=a_2+B_2+B_4+B_5+B_{10}+B_{11}+B_{13}$$

$$L_6=a_1+a_2+a_3+a_4+B_2$$

$$L_7=a_2+a_3+a_4+a_5+B_3$$

$$L_8=a_3+a_5+B_2+B_3+B_4+B_5+B_9$$

Figure 21:
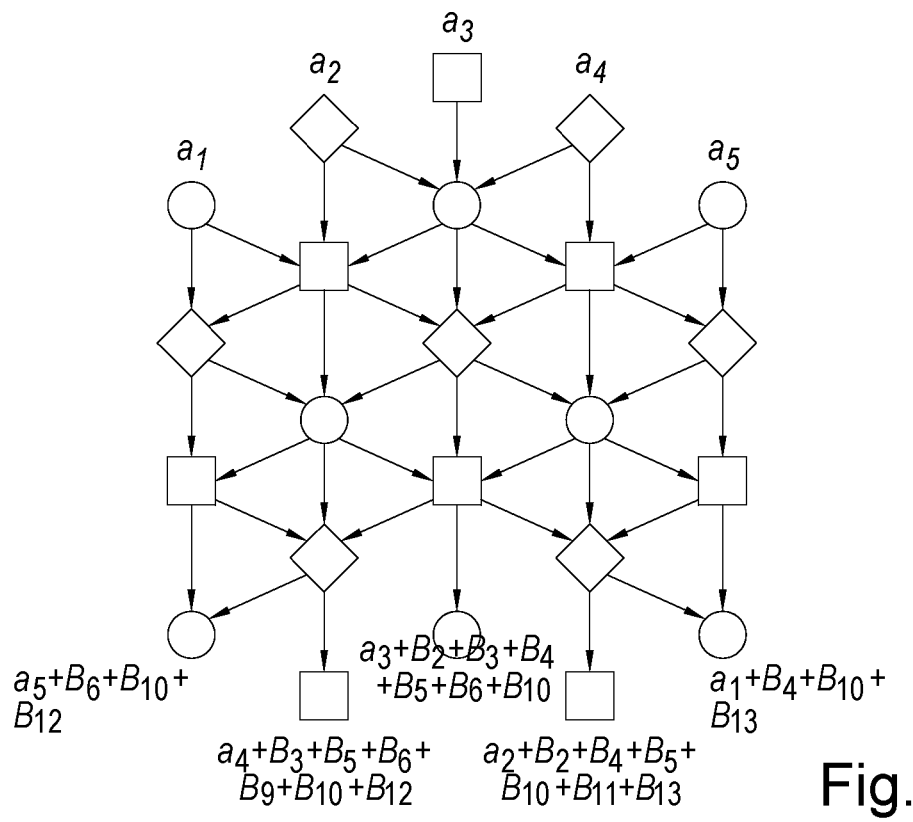

These can be used to represent the labels at the receiver nodes. From this, it can be seen that each receiver node has the right node formula plus some "B" terms. These are the classical measurement outcomes, as shown in FIG. 21. If the "B" terms sum to one (1) in any receiver node, then a Pauli-X gate is performed on the qubit at this receiver node.

From the above, it can be seen that the procedure takes 17 steps (layers of operations), that are formed from 3 single qubit gates, 2 measurements and 12 two-qubit gates. It will be noted that every pair of paths cross; therefore, were only edge-disjoint entanglement distribution to be performed, the following steps would need to be performed 5 times in series: prepare some $|+\rangle$ states, odds then evens two-qubit gates, measure, classical correct. In total, this would result in 20 layers of operations: 10 two-qubit gates, 5 measurements and 10 single qubit gates.

Using the method according to this embodiment of the present invention therefore provides a reduction from 25 to 17 layers of operations. More significantly, however, the method according to this embodiment of the present invention results in 14 layers of measurements and two qubit gates (which are more difficult operations to perform), compared with 15 layers with the edge-disjoint approach. It will be appreciated that the bigger the network, the bigger the gain.

The embodiment of the present invention, as outlined above, makes use of a subroutine denoted as "termination of a qubit". The effect of "terminating" a qubit is
(i) to realise or simulate a measurement of the qubit in the $|+\rangle$, $|-\rangle$ basis, and
(ii) in the case that the outcome is $|-\rangle$, performing suitable Z corrections on some others of the qubits to bring about the post-measurement state of those qubits that would have been realised if the outcome of the measurement had instead been $|+\rangle$.

It is possible to show that this notion of "termination" may be realised under certain circumstances, and in particular under every circumstance in which it may be used with the embodiment described above.

In many cases, there may not be a unique way in which to terminate a qubit, and in general the ways in which a qubit may be terminated depend meaningfully on the operations that have been performed on that qubit and the others in the procedure. Thus, the problem of determining how to terminate a qubit may be non-trivial. Below, one procedure to solve this problem is described, according to an embodiment of the present invention, which enables the decisions enumerated as part of the termination subroutine to be made easily. The techniques described incorporate the termination of qubits as part of the complete process, and extend to all ways in which this effect may be used as part of the procedure described below, howsoever those processes are performed or determined. It will be appreciated that any method of keeping track of the quantum state as part of the termination subroutine may be used.

In the case of termination, a (classical) state-vector simulation of the entanglement distribution procedure that is being run on the quantum computer is performed. This enables the state of the quantum circuit to be tracked, so it can be determined which corrections are needed in the termination subroutine (and then performing the corrections determined to be needed). It may be possible to perform this concurrent simulation efficiently classically.

The purpose of termination of a qubit is as follows. Let the first qubit be that which is to be terminated; in general the quantum state prior to termination can be described as one of two possibilities (the below are not normalised):

$$|0\rangle|\psi\rangle+|1\rangle|\overline{\psi}\rangle$$

or $$|x\rangle|\psi'\rangle$$

Where $|x\rangle$ is any of $|0\rangle$, $|1\rangle$, $|+\rangle$, $|-\rangle$ and $|\psi\rangle$, $|\overline{\psi}\rangle$, $|\psi'\rangle$ are general quantum states corresponding to the remaining qubits (those that are not to be terminated).

In the former case, the goal of termination is to perform operations to obtain the state (not normalised):

$$|+\rangle(|\psi\rangle+|\overline{\psi}\rangle)$$

This involves: first measurement of the first qubit in the X-basis, then classical operations on some of the other qubits if the outcome is $|-\rangle$.

In the latter case, the goal of termination is to perform operations to obtain the state (not normalised):

$$|+\rangle|\psi'\rangle$$

This involves identifying the state of the first qubit (i.e. which of $|0\rangle$, $|1\rangle$, $|+\rangle$, $|-\rangle$ that $|x\rangle$ is), either directly from the classical state-vector simulation or by performing a X-basis measurement, then performing a single-qubit quantum operation to put the qubit in the state $|+\rangle$ if necessary.

As part of the technique to compile a set of operations in accordance with embodiments of the present invention, a representation of the state of the n qubits involved in the entanglement distribution procedure is used, which suffices to describe (simulate classically) the effect of those operations which are involved in that procedure, to determine the corrections that are to be made to the other qubits of the array (i.e. those that are not being terminated). This representation, which is denoted as a "parity function tableau", comprises an array C with at most n+1 rows and n+1 columns, supplemented by a further column p with at most n+1 rows. The entries of C and p comprise noughts (0s) and ones (1s). These entries, and the number of rows in C and in p, may change in the course of compiling the operations to perform the entanglement distribution procedure in order to track the changes to the state of the system which would occur as that procedure is executed.

The means by which the changing state of the qubits involved in the entanglement distribution procedure is represented is as follows. Consider a procedure that involves a number of qubits, indexed by integers 1, 2, ..., n, and which are all initialised either to the state $|0\rangle$ or the state $|+\rangle$. A list $q_1, q_2, \ldots, q_k$ of the indices is defined, in increasing order, corresponding to qubits initialised in the state $|+\rangle$.

To represent the initial state, an array C and a column p is used, each of which has a number of rows which is one more than the number of qubits k initialised to the state $|+\rangle$. The number of columns of C is n+1. The columns of C are indexed by integers 0, 1, 2, ..., n, and the rows of both C and p by integers 0, 1, 2, ..., k.

Column 0 of C has entries comprising a 1 in row 0, and 0 in all other rows. For each row j ranging from 1 up to k, column $q_j$ has an entry of 1 in row j, and 0 in all other rows. The column p and all other columns of C have entries which are all 0.

The effect of each operation in the procedure—comprising Pauli X and Z operations, CNOT operations, and measurements in the $|0\rangle$, $|1\rangle$ basis or the $|+\rangle$, $|-\rangle$ basis—is simulated as follows:

For an X operation on some qubit with index j: toggle the value of the entry in column j, row 0 of the array C between 0 and 1.

For a Z operation on some qubit with index j: for each row r in which the entry in column j of C is equal to 1, toggle the value of the entry in row r of p between 0 and 1.

For a CNOT operation whose control is a qubit with index h, and whose target is a qubit with index/for each row r in which the entry in column h of C is equal to 1, toggle the entry in row r of column h of C between 0 and 1.

For a measurement in either the $|0\rangle$, $|1\rangle$ basis or the $|+\rangle$, $|-\rangle$ basis on a qubit with index j, first compute an equivalent representation of the pre-measurement state, transforming the array C and the column p, as follows:
1) Define an array D, comprising C with an extra column comprising the entries of p.
2) Put D into a "row echelon form", in which column j is either a pivot column, zero, or equal to column 0.
3) Having put D in row echelon form, take the final column of D as a revised value of p, and the remaining columns as a revised value of C.

For a measurement in the $|0\rangle$, $|1\rangle$ basis on some qubit with index j, the operations performed depends on the entries in column j of the array C. The transformation based on a row echelon form ensures that column j of C is either entirely 0, equal to column 0 of C, or has a single entry 1 in some row r>1.

If column j of C is entirely 0 or equal to column 0 of C, there is no change to C or to the column p. The measurement outcome is taken to be the entry in row 0 of column j of C; the measurement outcome is deterministic in this case.

If column j of C has a single 1 in row r>1, select a measurement outcome y to represent the measurement outcome. (The value of y may be fixed to consider the effect of a particular outcome, or chosen uniformly at random to simulate the distribution of outcomes which would be observed in practice under ideal conditions.) If y is equal to 1, toggle the entry in row 0 of any column h in which the entry in row r is equal to 1, and also toggle the entry in row 0 of p if the entry in row r is equal to 1. Having done this, then remove the row r entirely from C and from p, re-indexing all rows numbered higher than r.

For a measurement in the $|+\rangle$, $|-\rangle$ basis on some qubit with index j, the operations performed depend on the entries in column j of the array C. The transformation based on a row echelon form ensures that column j of C is either entirely 0, equal to column 0 of C, or has a single entry 1 in some row r>1.

If column j of C has a single 1 in some row r>1, and row r has only the single 1 entry in column j, there is no change to C or to the column p. The measurement outcome is taken to be $|+\rangle$ if the entry in row r of p is equal to 0, and $|-\rangle$ otherwise; the measurement outcome is deterministic in this case.

If column j of C has a single 1 in some row r>1, but row r has more than one entry which is 1; or if column j of C has no 1 entries in any row r>1; then add a new row to the bottom of C and of p with index k+1, with entries all 0, and proceed as follows. Select a measurement outcome y to represent the measurement outcome, where y=0 denotes a $|+\rangle$ outcome and y=1 denotes a $|-\rangle$ outcome. (The value of y may be fixed to consider the effect of a particular outcome, or chosen uniformly at random to simulate the distribution of outcomes which would be observed in practice under ideal conditions.) Then toggle the entry in row k+1 of column j, and also in row k+1 of p in the case that y=1. If column j has any other entries of 1 in a row 0<r<k+1, we also toggle the entry in row r of column j, and also in row r of p in the case that y=1.

Note that, in the above procedure, there is a simple distinction between the ways in which the array C and the column p are modified, depending on the bit y representing the outcome of a $|+\rangle$, $|-\rangle$ basis measurement. Specifically, in the case of a $|+\rangle$, $|-\rangle$ basis measurement whose outcome y is not deterministic, the difference is in one or two entries of p which may be toggled if y=1, corresponding to a measurement outcome of $|-\rangle$. Specifically, the entries which may be toggled are in the newly introduced row k+1, and in the case that column j has an entry of 1 in some row r>0 which has more than one entry of 1, also in the row r.

Let $p_0$ and $p_1$ be columns of length k+2, representing the two possible values of p depending on whether y=0 or y=1. Consider the difference between $p_0$ and $p_1$, represented by a column d of length k+2 which has a 1 in every row where $p_0$ and $p_1$ differ and a 0 in every row where they agree. Consider a "system of linear equations" C*x=d, representing in a well-defined mathematical way how the column d may be described in terms of a sum modulo 2 of columns of the array C.

It is possible to show that a solution x always exists, comprising a column of length n+1, indexed from 0 up to n. If Q is the set of integers corresponding to rows in which x has an entry of 1, it is possible (from the construction of the system of equations C*x=c) that simulating a Z operation on each qubit q in Q suffices to transform the post-measurement state corresponding to the outcome $|-\rangle$, to the post-measurement state corresponding to the outcome $|+\rangle$, which is witnessed by the fact that simulating this operation using the array C and the column $p_1$ yields the same array C and the column $p_0$. Thus, we may realise the effect of "terminating the qubit j" by performing a $|+\rangle, |-\rangle$ basis measurement on j, and (conditioned on obtaining the outcome $|-\rangle$) performing Z operations on a set of qubits Q determined in this manner.

Having defined the effect of "qubit termination" in this way, and having described one way to realise this effect in the setting in which the techniques are defined by means of pre-computed operations, this subroutine may be used with the embodiments outlined above.

In terms of the labels used to denote particular quantum states of the qubits, as shown in the Figures, if the labelled formula of some node is independent of all other node formulae, or it is linearly dependent on formulae of nodes that have already been measured in the Z-basis, then the qubit at that node can be measured safely in the Z-basis. Alternatively, if the formula of the node to be measured is neither of these, then the X-basis is used for the measurement. If the outcome $|-\rangle$ is measured, the termination subroutine applies Z gates to a subset of the other nodes, chosen such that the sums of the node formulae of the chosen nodes sum to the node formula of the terminated qubit. Such a subset can always be chosen because this condition has already been defined to apply only when the formula of the node to be terminated is not linearly independent of the other node formulae.

It will be seen from the above that, in at least preferred embodiments, the present invention provides a method of operating a quantum information processing system, and a quantum information processing system, that operates more efficiently and quickly, owing to the fewer steps in the sequence that results from not having the problem of sequentiality. It thus reduces the depth of the network, in a way that independent of the size of the network or the distance over which entanglement is to be distributed. This helps both to reduce the susceptibility of the quantum information processing system to loss of coherence between the qubits and noise in the system, which allows a practical realisation of operations on quantum architectures, and to reduce the time taken to perform the necessary operations.

The invention claimed is:

1. A method of operating a quantum information processing system, wherein the quantum information processing system comprises an array of a plurality of qubits and a plurality of connections between the plurality of qubits in the array, wherein the plurality of qubits in the array and the plurality of connections between the plurality of qubits are arranged such that at least two of the qubits in the array do not have a direct connection therebetween;

wherein the method of operating the quantum information processing system comprises:

for a linear network coding solution for performing an operation or operations between the quantum states of two or more qubits of the plurality of qubits;

wherein the linear network coding solution is based on a network of a plurality of nodes corresponding to the plurality of qubits and a plurality of edges between the nodes corresponding to the plurality of connections between the qubits; and wherein each of the plurality of edges comprises a direction from one of the plurality of nodes to another of the plurality of nodes, such that the plurality of nodes comprise:

one or more transmitter nodes that are connected to only one or more outgoing edges of the plurality of edges, each of the one or more outgoing edges having a direction towards another node;

one or more receiver nodes that are connected to only one or more incoming edges of the plurality of edges, each of the one or more incoming edges having a direction from another node; and one or more relay nodes that are each connected to at least an outgoing edge having a direction towards another node and to at least an incoming edge having a direction from another node:

determining a time ordering of the plurality of nodes of the network for operating on the plurality of qubits, the time ordering of the plurality of nodes comprising a group of a plurality of initial nodes that are first in the time ordering of the plurality of nodes, one or more groups each of a plurality of intermediate nodes that are intermediate in the time ordering of the plurality of nodes, and a group of a plurality of final nodes that are last in the time ordering of the plurality of nodes;

determining a time ordering of the plurality of edges of the network for operating between the plurality of qubits, wherein the time ordering is determined for the plurality of outgoing edges for the nodes in each of the groups of nodes in the time ordering of the plurality of nodes;

initialising the state of each of the plurality of qubits;

for the transmitter and relay nodes of the group of the plurality of initial nodes:

for each of the outgoing edges from these transmitter and relay nodes in order of the time ordering of the plurality of edges:

performing an operation between the quantum states of the pair of qubits that are connected by the connection corresponding to the outgoing edge;

for the transmitter and relay nodes of each of the groups of the plurality of intermediate nodes, processed in the time ordering of the intermediate groups:

for each of the outgoing edges from these transmitter and relay nodes in order of the time ordering of the plurality of edges:

performing an operation between the quantum states of the pair of qubits that are connected by the connection corresponding to the outgoing edge;

for the relay nodes of the group of the plurality of intermediate nodes that have an incoming edge from a node of a group of nodes having an earlier time ordering, realising a measurement of the quantum states of the qubits corresponding to those relay nodes of the group of the plurality of intermediate nodes; and for the relay nodes of the group of the plurality of intermediate nodes that have an incoming edge from a node of a group of nodes having a later time ordering, for each of the outgoing edges from these relay nodes in order of the time ordering of the plurality of edges, performing an operation between the quantum states of the pair of qubits that are connected by the connection corresponding to the outgoing edge;

for the transmitter and relay nodes of the group of the plurality of final nodes:

for each of the outgoing edges from these transmitter and relay nodes in order of the time ordering of the plurality of edges:

performing an operation between the quantum states of the pair of qubits that are connected by the connection corresponding to the outgoing edge;

for all of the relay nodes of the plurality of nodes, realising a measurement of the quantum states of the qubits corresponding to the relay nodes; and for all of the receiver nodes of the plurality of nodes, performing an operation on the quantum states of the qubits corresponding to the receiver nodes.

2. The method as claimed in claim 1, wherein the array of qubits and the network of nodes are arranged such that the pairs of qubits of the array that can interact are restricted to the corresponding pairs of the network that are connected by edges of the network.

3. The method as claimed in claim 1, wherein the overall operation to be performed comprises an operation between multiple pairs of qubits that are remote from each other in the array, and the individual operations comprise a plurality of quantum entanglement operations on the quantum states of a plurality of different pairs of qubits in the array.

4. The method as claimed in claim 1, wherein the qubits of the array of qubits are arranged such that a plurality of single-qubit operations acting on a plurality of different single qubits may be performed in parallel, and such that a plurality of CNOT operations acting on non-intersecting pairs of qubits.

5. The method as claimed in claim 1, wherein the quantum information processing comprises a control system for determining the operations to perform on the qubits based on the linear network coding solution, wherein the control system is arranged such that the classical information is not restricted to the network of the quantum information processing system.

6. The method as claimed in claim 1, wherein the time ordering of the plurality of nodes is determined such that two nodes may share the same integer under the time ordering, only if they are not adjacent in the network.

7. The method as claimed in claim 1, wherein the time ordering of the plurality of edges of the network is determined such that two edges that have a common relationship to a node do not have the same position according to the time ordering.

8. The method as claimed in claim 1, wherein the qubits which are at nodes that are not the sources of any directed edges are initialised to the quantum state $|0\rangle$, the qubits which are at nodes that have an incoming edge from a node having an earlier time ordering are initialised to the quantum state $|0\rangle$, and the remainder of the qubits are initialised to the quantum state $|+\rangle$.

9. The method as claimed in claim 1, wherein for each qubit for which the measurement outcome is $|-\rangle$, a termination subroutine comprises performing Z corrections on one or more of the other qubits of the array, such that the post-measurement state of the qubit is that which would have been realised if the measurement outcome had instead been $|+\rangle$.

10. The method as claimed in claim 9, wherein the method comprises classically simulating the process of distributing entanglement across the array of the plurality qubits to determine the Z corrections to perform on one or more of the other qubits of the array.

11. The method as claimed in claim 10, wherein the qubits are initialised to the state $|0\rangle$ or to the state $|+\rangle$,
wherein for k qubits initialised to the state $|+\rangle$ that are labelled $q_1, q_2, \ldots, q_k$,
wherein to classically simulate the process of distributing entanglement across the array of the plurality qubits, the initial state of the n qubits of the array of qubits is represented by an array C and a column p, each of which has a number of rows which is one more than the number of qubits k initialised to the state $|+\rangle$,
wherein the columns of C are indexed by integers 0, 1, 2, ..., n, and the rows of both C and p by integers 0, 1, 2, ..., k,
wherein column 0 of C initially has entries comprising a 1 in row 0, and 0 in all other rows; and
wherein for a Pauli X operation on a qubit with index j, the termination subroutine comprises toggling the value of the entry in column j, row 0 of the array C between 0 and 1.

12. The method as claimed in claim 10, wherein the qubits are initialised to the state $|0\rangle$ or to the state $|+\rangle$,
wherein for k qubits initialised to the state $|+\rangle$ that are labelled $q_1, q_2, \ldots, q_k$,
wherein to classically simulate the process of distributing entanglement across the array of the plurality qubits, the initial state of the n qubits of the array of qubits is represented by an array C and a column p, each of which has a number of rows which is one more than the number of qubits k initialised to the state $|+\rangle$,
wherein the columns of C are indexed by integers 0, 1, 2, ..., n, and the rows of both C and p by integers 0, 1, 2, ..., k,
wherein column 0 of C initially has entries comprising a 1 in row 0, and 0 in all other rows; and
wherein for a Pauli Z operation on a qubit with index j, the termination subroutine comprises, for each row r in which the entry in column j of C is equal to 1, toggling the value of the entry in row r of p between 0 and 1.

13. The method as claimed in claim 10, wherein the qubits are initialised to the state $|0\rangle$ or to the state $|+\rangle$,
wherein to classically simulating the process of distributing entanglement across the array of the plurality qubits, the initial state of the n qubits of the array of qubits is represented by an array C and a column p, each of which has a number of rows which is one more than the number of qubits k initialised to the state $|+\rangle$,
wherein the k qubits that are initialised to the state $|+\rangle$ are labelled $q_1, q_2, \ldots, q_k$,
wherein the columns of C are indexed by integers 0, 1, 2, ..., n, and the rows of both C and p by integers 0, 1, 2, ..., k,
wherein column 0 of C initially has entries comprising a 1 in row 0, and 0 in all other rows; and
wherein for a CNOT operation whose control is a qubit with index h and whose target is a qubit with index j, the termination subroutine comprises, for each row r in which the entry in column h of C is equal to 1, toggling the entry in row r of column h of C between 0 and 1.

14. The method as claimed in claim 10, wherein the qubits are initialised to the state $|0\rangle$ or to the state $|+\rangle$, wherein to classically simulating the process of distributing entanglement across the array of the plurality qubits, the initial state of the n qubits of the array of qubits is represented by an array C and a column p, each of which has a number of rows which is one more than the number of qubits k initialised to the state $|+\rangle$, wherein the k qubits that are initialised to the state $|+\rangle$ are labelled $q_1, q_2, \ldots, q_k$, wherein the columns of C are indexed by integers 0, 1, 2, ..., n, and the rows of both C and p by integers 0, 1, 2, ..., k, wherein column 0 of C initially has entries comprising a 1 in row 0, and 0 in all other rows; and wherein for a measurement in either the $|0\rangle$, $|1\rangle$ basis or the $|+\rangle$, $|-\rangle$ basis on a qubit with index j, the termination subroutine comprises computing an equivalent representation of the pre-measurement state, transforming the array C and the column p, as follows:

defining an array D, comprising C with an extra column comprising the entries of p, putting D into a row echelon form, in which column j is either a pivot column, zero, or equal to column 0, and having put D in row echelon form, taking the final column of D as a revised value of p, and the remaining columns as a revised value of C.

15. The method as claimed in claim 14, wherein for a measurement in the $|+\rangle$, $|-\rangle$ basis on a qubit with index j:

if column j of C has a single 1 in some row r>1, and row r has only the single 1 entry in column j, the termination subroutine comprises making no change to C or to the column p and taking the measurement outcome to be $|+\rangle$ if the entry in row r of p is equal to 0, and $|-\rangle$ otherwise;

if column j of C has a single 1 in some row r>1, but row r has more than one entry which is 1, or if column j of C has no 1 entries in any row r>1, the termination subroutine comprises adding a new row to the bottom of C and of p with index k+1, with entries all 0, and selecting a measurement outcome y to represent the measurement outcome, where y=0 denotes a $|+\rangle$ outcome and y=1 denotes $|-\rangle$ outcome, and toggling the entry in row k+1 of column j and in row k+1 of p when y=1, and if column j has any other entries of 1 in a row 0<r<k+1, toggling the entry in row r of column j and in row r of p when y=1.

16. The method as claimed in claim 14, wherein for a measurement in the $|0\rangle$, $|1\rangle$ basis on a qubit with index j:

if column j of C is entirely 0 or equal to column 0 of C, the termination subroutine comprises making no change to C or to the column p and taking the measurement outcome to be the entry in row 0 of column j of C;

if column j of C has a single 1 in row r>1, selecting a measurement outcome y to represent the measurement outcome, and if y is equal to 1, toggling the entry in row 0 of any column h in which the entry in row r is equal to 1, toggling the entry in row 0 of p if the entry in row r is equal to 1, and removing the row r from C and from p, re-indexing all rows numbered higher than r.

17. The method as claimed in claim 1, the method further comprising performing a delayed signal correction on the nodes of the network, wherein the delayed signal correction substitutes transmission of correlations by CNOT operations on the array of qubits, with transmission of classical correlations on the nodes of the network.

18. A quantum information processing system for performing an operation or operations between the quantum states of two or more qubits of a plurality of qubits of the quantum information processing system, wherein the quantum information processing system comprises:

an array of a plurality of qubits and a plurality of connections between the plurality of qubits in the array, wherein the plurality of qubits in the array and the plurality of connections between the plurality of qubits are arranged such that at least two of the qubits in the array do not have a direct connection therebetween;

wherein the quantum information processing system is configured to:

for a linear network coding solution for performing an operation or operations between the quantum states of two or more qubits of the plurality of qubits;

wherein the linear network coding solution is based on a network of a plurality of nodes corresponding to the plurality of qubits and a plurality of edges between the nodes corresponding to the plurality of connections between the qubits; and wherein each of the plurality of edges comprises a direction from one of the plurality of nodes to another of the plurality of nodes, such that the plurality of nodes comprise:

one or more transmitter nodes that are connected to only one or more outgoing edges of the plurality of edges, each of the one or more outgoing edges having a direction towards another node;

one or more receiver nodes that are connected to only one or more incoming edges of the plurality of edges, each of the one or more incoming edges having a direction from another node; and one or more relay nodes that are each connected to at least an outgoing edge having a direction towards another node and to at least an incoming edge having a direction from another node:

determine a time ordering of the plurality of nodes of the network for operating on the plurality of qubits, the time ordering of the plurality of nodes comprising a group of a plurality of initial nodes that are first in the time ordering of the plurality of nodes, one or more groups each of a plurality of intermediate nodes that are intermediate in the time ordering of the plurality of nodes, and a group of a plurality of final nodes that are last in the time ordering of the plurality of nodes;

determine a time ordering of the plurality of edges of the network for operating between the plurality of qubits, wherein the time ordering is determined for the plurality of outgoing edges for the nodes in each of the groups of nodes in the time ordering of the plurality of nodes;

initialise the state of each of the plurality of qubits;

for the transmitter and relay nodes of the group of the plurality of initial nodes:

for each of the outgoing edges from these transmitter and relay nodes in order of the time ordering of the plurality of edges:

perform an operation between the quantum states of the pair of qubits that are connected by the connection corresponding to the outgoing edge;

for the transmitter and relay nodes of each of the groups of the plurality of intermediate nodes, processed in the time ordering of the intermediate groups:
  for each of the outgoing edges from these transmitter and relay nodes in order of the time ordering of the plurality of edges:
    perform an operation between the quantum states of the pair of qubits that are connected by the connection corresponding to the outgoing edge;
  for the relay nodes of the group of the plurality of intermediate nodes that have an incoming edge from a node of a group of nodes having an earlier time ordering, realise or simulate a measurement of the quantum states of the qubits corresponding to those relay nodes of the group of the plurality of intermediate nodes; and
  for the relay nodes of the group of the plurality of intermediate nodes that have an incoming edge from a node of a group of nodes having a later time ordering, for each of the outgoing edges from these relay nodes in order of the time ordering of the plurality of edges, perform an operation between the quantum states of the pair of qubits that are connected by the connection corresponding to the outgoing edge;
for the transmitter and relay nodes of the group of the plurality of final nodes:
  for each of the outgoing edges from these transmitter and relay nodes in order of the time ordering of the plurality of edges:
    perform an operation between the quantum states of the pair of qubits that are connected by the connection corresponding to the outgoing edge;
  for all of the relay nodes of the plurality of nodes, realise or simulate a measurement of the quantum states of the qubits corresponding to the relay nodes; and
  for all of the receiver nodes of the plurality of nodes, perform an operation on the quantum states of the qubits corresponding to the receiver nodes.

19. A non-transitory computer readable storage medium storing computer software code which when executing on a quantum information processing system performs a method of operating a quantum information processing system, wherein the quantum information processing system comprises an array of a plurality of qubits and a plurality of connections between the plurality of qubits in the array, wherein the plurality of qubits in the array and the plurality of connections between the plurality of qubits are arranged such that at least two of the qubits in the array do not have a direct connection therebetween;
  wherein the method of operating the quantum information processing system comprises:
  for a linear network coding solution for performing an operation or operations between the quantum states of two or more qubits of the plurality of qubits;
    wherein the linear network coding solution is based on a network of a plurality of nodes corresponding to the plurality of qubits and a plurality of edges between the nodes corresponding to the plurality of connections between the qubits; and
    wherein each of the plurality of edges comprises a direction from one of the plurality of nodes to another of the plurality of nodes, such that the plurality of nodes comprise:
      one or more transmitter nodes that are connected to only one or more outgoing edges of the plurality of edges, each of the one or more outgoing edges having a direction towards another node;
      one or more receiver nodes that are connected to only one or more incoming edges of the plurality of edges, each of the one or more incoming edges having a direction from another node; and
      one or more relay nodes that are each connected to at least an outgoing edge having a direction towards another node and to at least an incoming edge having a direction from another node:
    determining a time ordering of the plurality of nodes of the network for operating on the plurality of qubits, the time ordering of the plurality of nodes comprising a group of a plurality of initial nodes that are first in the time ordering of the plurality of nodes, one or more groups each of a plurality of intermediate nodes that are intermediate in the time ordering of the plurality of nodes, and a group of a plurality of final nodes that are last in the time ordering of the plurality of nodes;
    determining a time ordering of the plurality of edges of the network for operating between the plurality of qubits, wherein the time ordering is determined for the plurality of outgoing edges for the nodes in each of the groups of nodes in the time ordering of the plurality of nodes;
    initialising the state of each of the plurality of qubits;
    for the transmitter and relay nodes of the group of the plurality of initial nodes:
      for each of the outgoing edges from these transmitter and relay nodes in order of the time ordering of the plurality of edges:
        performing an operation between the quantum states of the pair of qubits that are connected by the connection corresponding to the outgoing edge;
    for the transmitter and relay nodes of each of the groups of the plurality of intermediate nodes, processed in the time ordering of the intermediate groups:
      for each of the outgoing edges from these transmitter and relay nodes in order of the time ordering of the plurality of edges:
        performing an operation between the quantum states of the pair of qubits that are connected by the connection corresponding to the outgoing edge;
      for the relay nodes of the group of the plurality of intermediate nodes that have an incoming edge from a node of a group of nodes having an earlier time ordering, realising a measurement of the quantum states of the qubits corresponding to those relay nodes of the group of the plurality of intermediate nodes; and
      for the relay nodes of the group of the plurality of intermediate nodes that have an incoming edge from a node of a group of nodes having a later time ordering, for each of the outgoing edges from these relay nodes in order of the time ordering of the plurality of edges, performing an operation between the quantum states of the pair of qubits that are connected by the connection corresponding to the outgoing edge;

for the transmitter and relay nodes of the group of the plurality of final nodes:
   for each of the outgoing edges from these transmitter and relay nodes in order of the time ordering of the plurality of edges:
      performing an operation between the quantum states of the pair of qubits that are connected by the connection corresponding to the outgoing edge;
for all of the relay nodes of the plurality of nodes, realising a measurement of the quantum states of the qubits corresponding to the relay nodes; and
for all of the receiver nodes of the plurality of nodes, performing an operation on the quantum states of the qubits corresponding to the receiver nodes.

* * * * *